(12) United States Patent
Doi et al.

(10) Patent No.: US 7,522,828 B2
(45) Date of Patent: Apr. 21, 2009

(54) INTERCHANGEABLE LENS TYPE CAMERA SYSTEM AND INTERMEDIATE ACCESSORY

(75) Inventors: Takahiro Doi, Hachioji (JP); Mamoru Sakashita, Okaya (JP)

(73) Assignee: Olympus Corporation, Tokyo (JP)

( * ) Notice: Subject to any disclaimer, the term of this patent is extended or adjusted under 35 U.S.C. 154(b) by 188 days.

(21) Appl. No.: 11/375,271

(22) Filed: Mar. 14, 2006

(65) Prior Publication Data

US 2006/0165401 A1    Jul. 27, 2006

Related U.S. Application Data

(63) Continuation of application No. PCT/JP2004/013505, filed on Sep. 16, 2004.

(30) Foreign Application Priority Data

Oct. 9, 2003    (JP) ............................. 2003-351228

(51) Int. Cl.
*G03B 17/12*    (2006.01)
(52) U.S. Cl. ........................ 396/71; 396/530; 348/360
(58) Field of Classification Search ................... 396/71, 396/303, 530, 543
See application file for complete search history.

(56) References Cited

U.S. PATENT DOCUMENTS 4,974,004 A * 11/1990 Kawasaki et al. ............. 396/71

5,382,994 A * 1/1995 Naito et al. .................. 396/530
6,845,218 B2 * 1/2005 Miyasaka et al. ........... 396/301
2002/0118963 A1   8/2002 Uenaka et al.

FOREIGN PATENT DOCUMENTS

| EP | 0 266 793 | 5/1988 |
|---|---|---|
| JP | 59-048742 | 3/1984 |
| JP | 62-267732 | 11/1987 |
| JP | 63-76834 | 5/1988 |
| JP | 63-118113 | 5/1988 |
| JP | 63-199335 | 8/1988 |
| JP | 07-234432 | 9/1995 |
| JP | 2002-258380 | 9/2002 |

* cited by examiner

*Primary Examiner*—W. B. Perkey
(74) *Attorney, Agent, or Firm*—Straub and Pokotylo; John C. Pokotylo

(57) ABSTRACT

An interchangeable lens type camera system in which an intermediate accessory is removably attached between a camera body and a lens barrel includes a first CPU provided in the camera body, a second CPU provided in the intermediate accessory, and a third CPU provided in the lens barrel. The first CPU supplies a reset signal to the second CPU in association with attachment of the intermediate accessory, and the second CPU receives the reset signal supplied from the first CPU and supplies the reset signal to the third CPU.

10 Claims, 13 Drawing Sheets

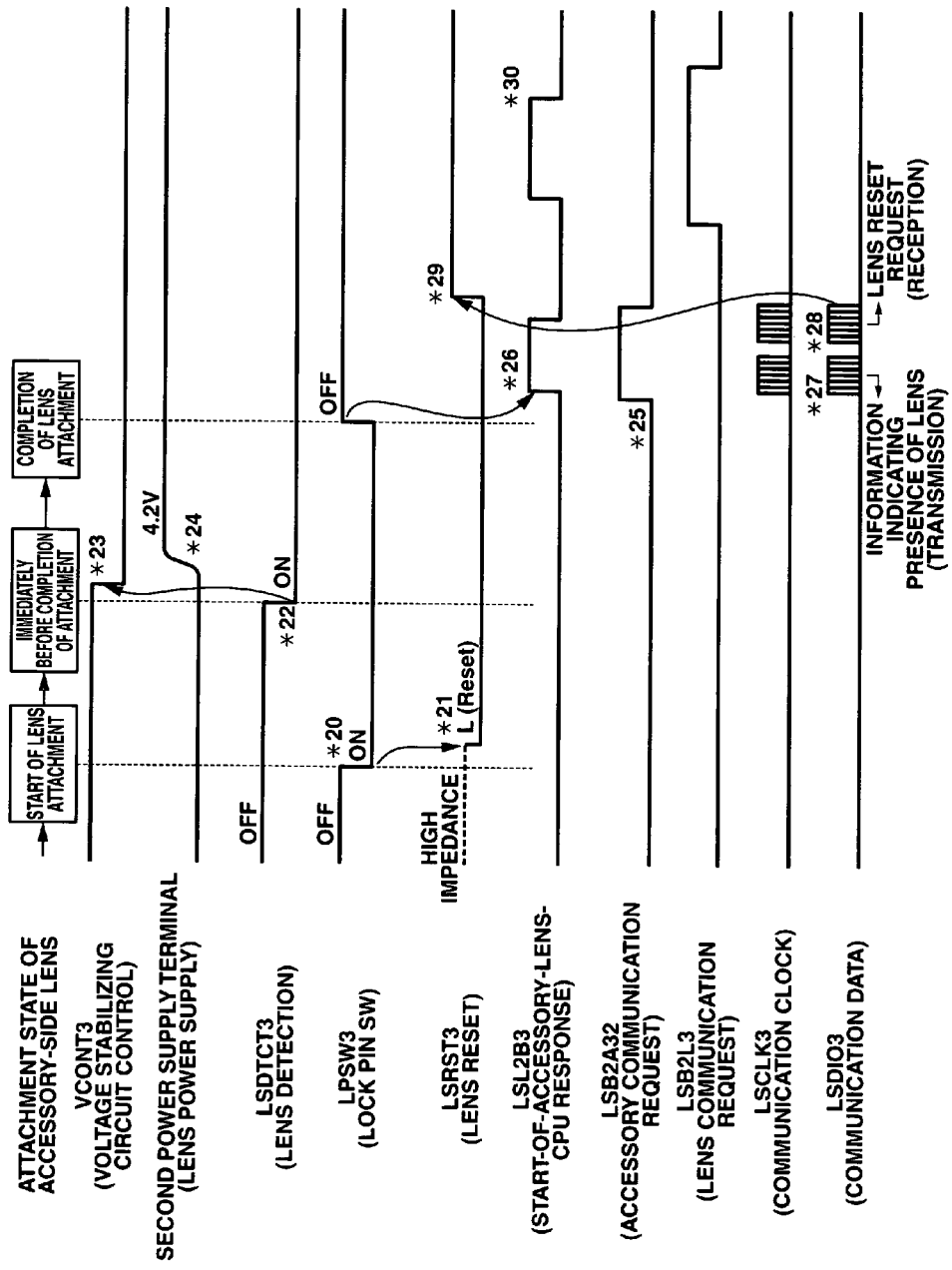

INTERCHANGEABLE LENS TYPE CAMERA SYSTEM AND INTERMEDIATE ACCESSORY

CROSS REFERENCE TO RELATED APPLICATION

This application is a continuation application of PCT/JP2004/013505 filed on Sep. 16, 2004 and claims benefit of Japanese Application No. 2003-351228 filed in Japan on Oct. 9, 2003, the entire contents of which are incorporated herein by this reference.

BACKGROUND OF THE INVENTION

1. Field of the Invention

The present invention relates to interchangeable lens type camera systems and intermediate accessories. More particularly, the present invention relates to an interchangeable lens type camera system having a camera body and an intermediate accessory and an interchangeable lens that are removably attached to the camera body and to the intermediate accessory.

2. Description of the Related Art

As widely known, interchangeable lens cameras do not have integral structures in which shooting lenses are fixed to the camera bodies, unlike so-called compact cameras. Each interchangeable lens camera is formed of a combination of the camera body and one of multiple interchangeable lenses. Matching between the camera body and the interchangeable lens requires special consideration.

For example, in order to prevent wrong operations, power is supplied from a power supply at the camera body side to an electrical circuit in an interchangeable lens at a predetermined timing after attachment of the interchangeable lens to the camera body is completed. Such power supply methods are disclosed in, for example, Japanese Unexamined Patent Application Publication No. 59-048742 and Japanese Unexamined Patent Application Publication No. 62-267732.

Japanese Unexamined Patent Application Publication No. 59-048742 discloses a camera system in which multiple contact terminals on the mount portion of the camera body are opposed to multiple contact terminals on the mount portion of the interchangeable lens. In this camera system, the contact terminals become conductive upon completion of attachment of the interchangeable lens to turn on the power supply. With this structure, power can be easily supplied from the camera body to the interchangeable lens only by attaching the interchangeable lens to the camera body.

Japanese Unexamined Patent Application Publication No. 62-267732 discloses a camera system including a switch whose state is changed upon completion of attachment of an interchangeable lens to a camera body. Under AND condition between the change in the state of the switch and a specific operational state (for example, turning on of a power switch or pressing of a release button) of the camera body, supply of power to the interchangeable lens is started. With this structure, power can be selectively supplied from the camera body to the interchangeable lens.

SUMMARY OF THE INVENTION

The present invention provides an interchangeable lens type camera system in which an intermediate accessory is removably attached between a camera body and a lens barrel. The interchangeable lens type camera system includes a first CPU provided in the camera body, a second CPU provided in the intermediate accessory, and a third CPU provided in the lens barrel. The first CPU supplies a reset signal to the second CPU in association with attachment of the intermediate accessory, and the second CPU receives the reset signal supplied from the first CPU and supplies the reset signal to the third CPU.

BRIEF DESCRIPTION OF THE DRAWINGS

FIG. 14 is a timing chart showing an operation of the ACPU of the rear converter before and after the attachment of the interchangeable lens in FIG. 3.

DETAILED DESCRIPTION OF THE PREFERRED EMBODIMENT(S)

Embodiments of the present invention will be described with reference to the attached drawings.

Figure 1:
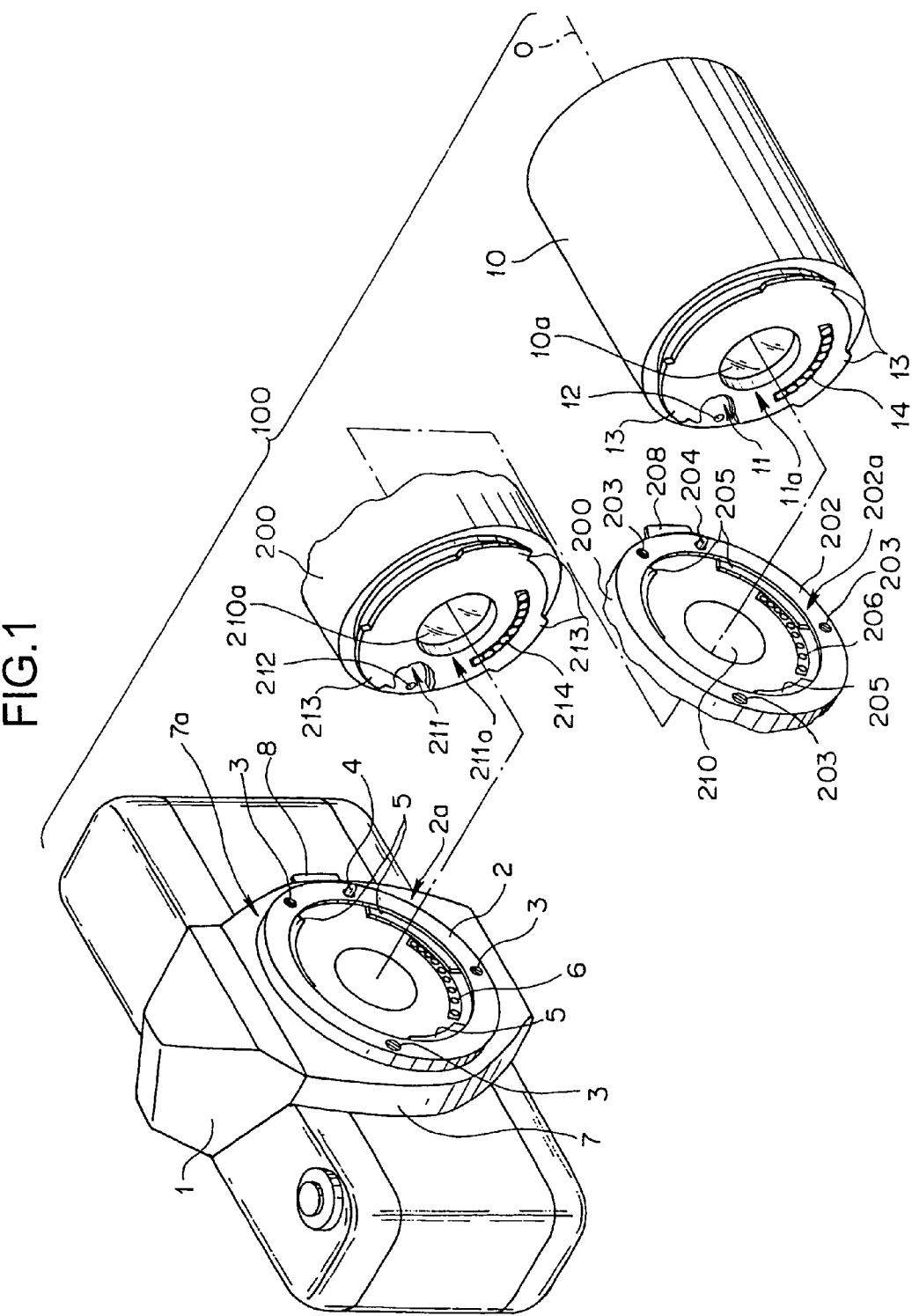
FIG. 1 is a perspective view of a camera system including a camera body, a rear converter removably attachable to the camera body, and an interchangeable lens removably attachable to the rear converter, according to an embodiment of the present invention.

FIG. 1 is a perspective view of a camera system including a camera body, a rear converter removably attachable to the camera body, and an interchangeable lens removably attachable to the rear converter, according to an embodiment of the present invention. In the following description, it is assumed that the front side of the optical axis O of the lens is a subject side and the backward side thereof is an image-forming plane side. So-called bayonet mounts are used as mounts to which the rear converter and the interchangeable lens according to the embodiment of the present invention are attached.

As shown in FIG. 1, an interchangeable lens type camera system 100 mainly includes a camera body 1, a rear converter 200 that is removably attached to the camera body 1 and that is an intermediate accessory, and an interchangeable lens 10 that is removably attached to the camera body 1 and the rear converter 200 and that is a lens barrel. A mount attachment 7 to which the rear converter 200 or the interchangeable lens 10 is attached extends forward in the center of the front face of the camera body 1. A ring-shaped camera-side mount 2 is fixed to the front face 7a of the mount attachment 7 with three screws 3. The camera-side mount 2 has a mount surface 2a that is a horizontal surface orthogonal to the optical axis O of the lens.

An interlocking pin 4 extends forward from the right-side portion (in FIG. 1) of the mount surface (hereinafter referred to as a camera-side mount surface) 2a of the camera-side mount 2. The interlocking pin 4 is fitted into an engaging hole 212 of the rear converter 200 or an engaging hole 12 of the interchangeable lens 10. The interlocking pin 4 is forced by a pressure spring 4a (see FIG. 2) embedded in the mount 2.

Three bayonet pawl engaging portions 5 are provided on the inner rim of the camera-side mount 2 at equal intervals. Three bayonet pawls 213 of the rear converter 200 or three bayonet pawls 13 of the interchangeable lens 10 are slidably fitted into the three bayonet pawl engaging portions 5. Multiple camera-side terminals 6 are provided on the front face 7a of the mount attachment 7 in an area surrounded by the camera-side mount 2. The multiple camera-side terminals 6 are in contact with multiple camera-side terminals 214 formed on the rear converter 200 (see FIG. 4) or multiple lens-side terminals 14 formed on the interchangeable lens 10. The contact surface of each of the camera-side terminals 6 is semi-circular and extends forward.

An attachment release button 8 for the rear converter 200 or the interchangeable lens 10 is provided on the right-side surface of the mount attachment 7. When the rear converter or the interchangeable lens is to be removed, the release button 8 is used to eject the interlocking pin 4, which extends forward in the engaging hole 212 of the rear converter 200 or in the engaging hole 12 of the interchangeable lens 10 when the rear converter or the interchangeable lens is attached, from the engaging hole 212 of the rear converter 200 or the engaging hole 12 of the interchangeable lens 10.

The rear converter 200 has multiple lenses 210a inside. A ring-shaped rear-converter-side mount 211 is provided at the rear end surface of the rear converter 200. The rear-converter-side mount 211 has a bayonet surface 211a orthogonal to the optical axis O. The three bayonet pawls 213 are provided on the outer rim of the bayonet surface 211a. The bayonet pawls 213 are formed in the same plane as the bayonet surface 211a and extend outward.

In the rear-converter-side mount 211, the engaging hole 212, into which the interlocking pin 4 is fitted when the rear converter 200 is attached to the camera body 1, is provided more deeply forward than an amount of the extension of the interlocking pin 4 extending from the camera-side mount surface 2a. On the rear-converter-side bayonet surface 211a, the multiple camera-side terminals 214 are provided. The multiple camera-side terminals 214 are slidably in contact with (connected to) the multiple camera-side terminals 6. The multiple camera-side terminals 214 are formed in the same plane as the rear-converter-side bayonet surface 211a.

In order to attach the rear converter 200 to the camera body 1 having the above structure, the three bayonet pawls 213 of the rear converter 200 are fitted between the three bayonet pawl engaging portions 5 of the camera body 1, respectively. Here, the interlocking pin 4 is pressed against the rear-converter-side mount 211 and is retracted (see FIG. 5).

Next, the rear converter 200 is rotated around the optical axis O of the lens in one direction until the rear converter 200 is stopped. Then, the lens is fixed and is attached at a position where the three bayonet pawls 213 engage with the three bayonet pawl engaging portions 5. During this, the interlocking pin 4 is pressed against the rear-converter-side mount 211 and retracted and, then, is fitted into the engaging hole 212 at the position where the rear converter is attached (see FIG. 7). During a period when the interlocking pin 4 changes from the state immediately before the interlocking pin 4 is fitted into the engaging hole 212 to the state where the interlocking pin 4 is fitted therein, the multiple camera-side terminals 6 on the camera body 1 are properly in contact with the multiple camera-side terminals 214 on the rear converter 200. The rear converter 200 is attached to the camera body 1 in the manner described above.

In contrast, in order to remove the rear converter 200 from the camera body 1, pressing the attachment release button 8 moves the interlocking pin 4 backward against the elasticity of the pressure spring 4a, and the interlocking pin 4 is ejected from the engaging hole 212 of the rear converter 200.

Then, the release button 8 is rotated with being pressed in a direction opposite to the direction of the attachment of the rear converter 200. The rotation of the attachment release button 8 causes the three bayonet pawls 213 to slide in the three bayonet pawl engaging portions 5 in a direction opposite to the direction of the attachment of the bayonet pawls 213 to separate the three bayonet pawls 213 from the three-bayonet pawl engaging portions 5. When the rear converter 200 is pulled out in the optical axis direction, the attachment of the rear converter 200 to the camera body 1 is released. The rear converter 200 is removed from the camera body 1 in the manner described above. The interchangeable lens 10 is attached to and removed from the camera body 1 in the same manner as in the rear converter 200.

A ring-shaped rear-converter-side mount 202 is fixed to the front face of the rear converter 200 with three screws 203. The rear-converter-side mount 202 has a mount surface 202a to which the interchangeable lens 10 is attached and which is a horizontal surface orthogonal to the optical axis O of the lens.

An interlocking pin 204 extends forward from the right-side portion (in FIG. 1) of the mount surface (hereinafter referred to as a rear-converter-side mount surface) 202a of the rear-converter-side mount 202. The interlocking pin 204 is fitted into the engaging hole 12 of the interchangeable lens 10. The interlocking pin 204 is forced by a pressure spring 204a (see FIG. 4) embedded in the mount 202.

Three bayonet pawl engaging portions 205 are provided on the inner rim of the rear-converter-side mount 202 at equal intervals. The three bayonet pawls 13 of the interchangeable lens 10 are slidably fitted into the bayonet pawl engaging portions 205. Multiple lens-side terminals 206 are provided in an area surrounded by the rear-converter-side mount 202. The multiple lens-side terminals 206 are in contact with multiple lens-side terminals 14 formed on the interchangeable lens 10. The contact surface of each of the multiple lens-side terminals 206 is semi-circular and extends forward.

An attachment release button 208 for the interchangeable lens 10 is provided on the front portion of the right-side surface of the rear converter 200. When the lens is to be removed, the release button 208 is used to eject the interlocking pin 204, which extends forward in the engaging hole 12 of the interchangeable lens 10 when the lens is attached, from the engaging hole 12 of the interchangeable lens 10.

The interchangeable lens 10 has multiple lenses 10a inside. A ring-shaped lens-side mount 11 is provided at the rear end surface of the interchangeable lens 10. The lens-side mount 11 has a bayonet surface 11a orthogonal to the optical axis O of the lens. The three bayonet pawls 13 are provided on the outer rim of the bayonet surface 11a. The bayonet pawls 13 are formed in the same plane as the bayonet surface 11a and extend outward.

In the lens-side mount 11, the engaging hole 12, into which the interlocking pin 204 is fitted when the interchangeable lens 10 is attached to the rear converter 200, is provided more deeply forward than an amount of the extension of the interlocking pin 204 extending from the rear-converter-side mount surface 202a. On the lens-side bayonet surface 11a, the multiple lens-side terminals 14 are provided. The multiple lens-side terminals 14 are slidably in contact with (connecting to) the multiple lens-side terminals 206. The multiple lens-side terminals 14 are formed in the same plane as the lens-side bayonet surface 11a.

In order to attach the interchangeable lens 10 to the rear converter 200 having the above structure, the three bayonet pawls 13 of the interchangeable lens 10 are fitted between the three bayonet pawl engaging portions 205 of the rear converter 200, respectively. Here, the interlocking pin 204 is pressed against the lens-side mount 11 and is retracted (see FIG. 6).

Next, the interchangeable lens 10 is rotated around the optical axis O of the lens in one direction until the interchangeable lens 10 is stopped. Then, the lens is fixed and is attached at a position where the three bayonet pawls 13 engage with the three bayonet pawl engaging portions 205. During this, the interlocking pin 204 is pressed against the lens-side mount 11 and retracted and, then, is fitted into the engaging hole 12 at the position where the lens is attached (see FIG. 7). During a period when the interlocking pin 204 changes from the state immediately before the interlocking pin 204 is fitted into the engaging hole 12 to the state where the interlocking pin 204 is fitted therein, the multiple lens-side terminals 206 on the rear converter 200 are properly in contact with the multiple lens-side terminals 14 on the interchangeable lens 10. The interchangeable lens 10 is attached to the rear converter 200 in the manner described above.

In contrast, in order to remove the interchangeable lens 10 from the rear converter 200, pressing the attachment release button 208 moves the interlocking pin 204 backward against the elasticity of the pressure spring 204a, and the interlocking pin 204 is ejected from the engaging hole 12 of the interchangeable lens 10.

Then, the release button 208 is rotated with being pressed in a direction opposite to the direction of the attachment of the interchangeable lens 10. The rotation of the attachment release button 208 causes the three bayonet pawls 13 to slide in the three bayonet pawl engaging portions 205 in a direction opposite to the direction of the attachment of the bayonet pawls 13 to separate the three bayonet pawls 13 from the bayonet pawl engaging portions 205. When the interchangeable lens 10 is pulled out in the optical axis direction, the attachment of the interchangeable lens 10 to the rear converter 200 is released. The interchangeable lens 10 is removed from the rear converter 200 in the manner described above.

Figure 2:
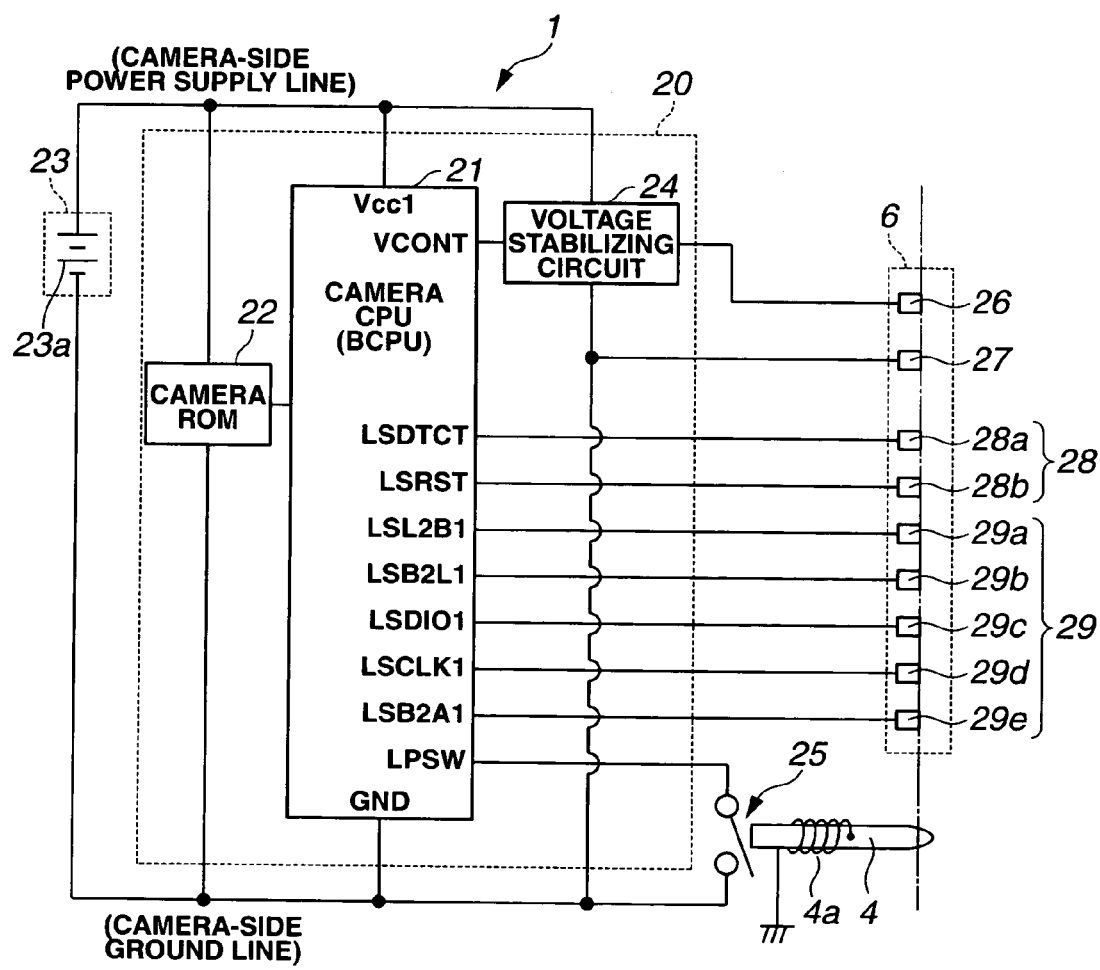
FIG. 2 is a block diagram showing the configuration of an electrical circuit in the camera body in FIG. 1.

FIG. 2 is a block diagram showing the configuration of an electrical circuit in the camera body 1 in FIG. 1.

As shown in FIG. 2, the electrical circuit of the camera body 1 mainly includes an electrical circuit 20, a power supply circuit 23, a detection switch 25, and the multiple camera-side terminals 6. The electrical circuit 20 includes a camera CPU (hereinafter referred to as a BCPU) 21, which is a first CPU for controlling the operation of the entire camera body 1, a camera ROM 22, and a voltage stabilizing circuit 24. The power supply circuit 23 includes a power supply battery 23a or an AC adaptor (not shown). The detection switch 25 is a push switch for detecting a state of the interlocking pin 4 forced by the pressure spring 4a. The camera ROM 22 may be included in the BCPU 21.

The BCPU 21 has a power supply terminal Vcc1, a voltage-stabilizing-circuit control terminal VCONT, a lens detecting terminal LSDTCT, an accessory-and-lens reset terminal LSRST, a start-of-lens-CPU response terminal LSL2B1, a lens communication request terminal LSB2L1, a communication data terminal LSDIO1, a communication clock terminal LSCLK1, an accessory communication request terminal LSB2A1, a lock pin switch (SW) terminal LPSW, and a GND terminal.

As described below, the BCPU 21 further has a timer (not shown) to be used for canceling a reset signal supplied to a rear converter CPU 221 (see FIG. 4) of the rear converter 200 through the accessory-and-lens reset terminal LSRST.

The camera-side terminals 6 include a first power supply terminal 26, a first ground terminal 27, a camera-side signal terminal 28, and a camera-side communication terminal 29. The first power supply terminal 26 is used for supplying power to the rear converter 200 and the interchangeable lens 10. The camera-side signal terminal 28 includes a first signal terminal 28a used for detecting attachment of the rear converter 200 or the interchangeable lens 10 and a second signal terminal 28b used for supplying a reset signal to the ACPU 221 (see FIG. 4) of the rear converter 200 or a CPU 41 of the interchangeable lens 10, described below. The camera-side communication terminal 29 includes a first communication terminal 29a, a second communication terminal 29b, a third communication terminal 29c, a fourth communication terminal 29d, and a fifth communication terminal 29e, and is used for intercommunication between the BCPU 21 and the ACPU 221 and lens CPU 41 or the lens CPU 41.

The camera ROM 22, the BCPU 21, and the voltage stabilizing circuit 24 are connected between a camera-side power supply line and a camera-side ground line of the power supply circuit 23. A fixed terminal of the detection switch 25 is also connected to the camera-side ground line.

In the BCPU 21, the power supply terminal Vcc1 is connected to the camera-side power supply line. The terminal VCONT is connected to the input end of the voltage stabilizing circuit 24. The terminal LSDTCT is connected to the first signal terminal 28a. The accessory-and-lens reset terminal LSRST is connected to the second signal terminal 28b. The LSL2B1 terminal is connected to the first communication terminal 29a. The LSB2L1 terminal is connected to the second communication terminal 29b. The LSDIO1 terminal is connected to the third communication terminal 29c. The LSCLK1 terminal is connected to the fourth communication terminal 29d. The accessory communication request terminal LSB2A1 is connected to the fifth communication terminal 29e. The LPSW terminal is connected to the detection switch 25. The GND terminal is connected to the camera-side ground line.

When the rear converter 200 is attached to the camera body 1, of the multiple camera-side terminals 6, the first power supply terminal 26, the first ground terminal 27, the camera-side signal terminal 28, and the camera-side communication terminal 29 are in contact with a third power supply terminal 226, a third ground terminal 227, a camera-side signal terminal 228, and a camera-side communication terminal 229, respectively, of the rear converter 200, as described below with reference to FIGS. 5, 6, and 7.

When the interchangeable lens 10 is attached to the camera body 1, of the multiple camera-side terminals 6, the first power supply terminal 26, the first ground terminal 27, the camera-side signal terminal 28, and the camera-side communication terminal 29 are in contact with a second power supply terminal 46, a second ground terminal 47, a lens-side signal terminal 48, and a lens-side communication terminal 49 (described below), respectively, of the interchangeable lens 10.

The camera ROM 22 is connected to the BCPU 21. The output end of the voltage stabilizing circuit 24 is connected to the first power supply terminal 26. The first ground terminal 27 is connected to the camera-side ground line.

The camera ROM 22 is, for example, a non-volatile memory and stores information for, for example, identifying the rear converter 200 and the interchangeable lens 10.

The voltage stabilizing circuit 24 is, for example, a DC/DC converter. The voltage stabilizing circuit 24 is controlled by the VCONT terminal of the BCPU 21 to stabilize voltage output from the power supply circuit 23 and supplies the stabilized voltage as power supply voltage to the interchangeable lens 10 and the rear converter 200 or to the interchangeable lens 10 through the first power supply terminal 26.

When the rear converter 200 or the interchangeable lens 10 is not attached to the camera body 1, the interlocking pin 4 is forced by the pressure spring 4a. As a result, the front end of the interlocking pin 4 extends forward from the camera-side mount surface 2a and the back end of the interlocking pin 4 is positioned in front of and apart from the detection switch 25. Accordingly, the detection switch 25, which is the push switch, is in a first state, that is, in OFF state.

The detection switch 25, which is the push switch, detects whether the rear converter 200 or the interchangeable lens 10 is attached to the camera body 1. Specifically, the detection switch 25 detects whether the interlocking pin 4 forced by the pressure spring 4a is in the OFF state, which is the first state, or in ON state, which is a second state.

Figure 3:
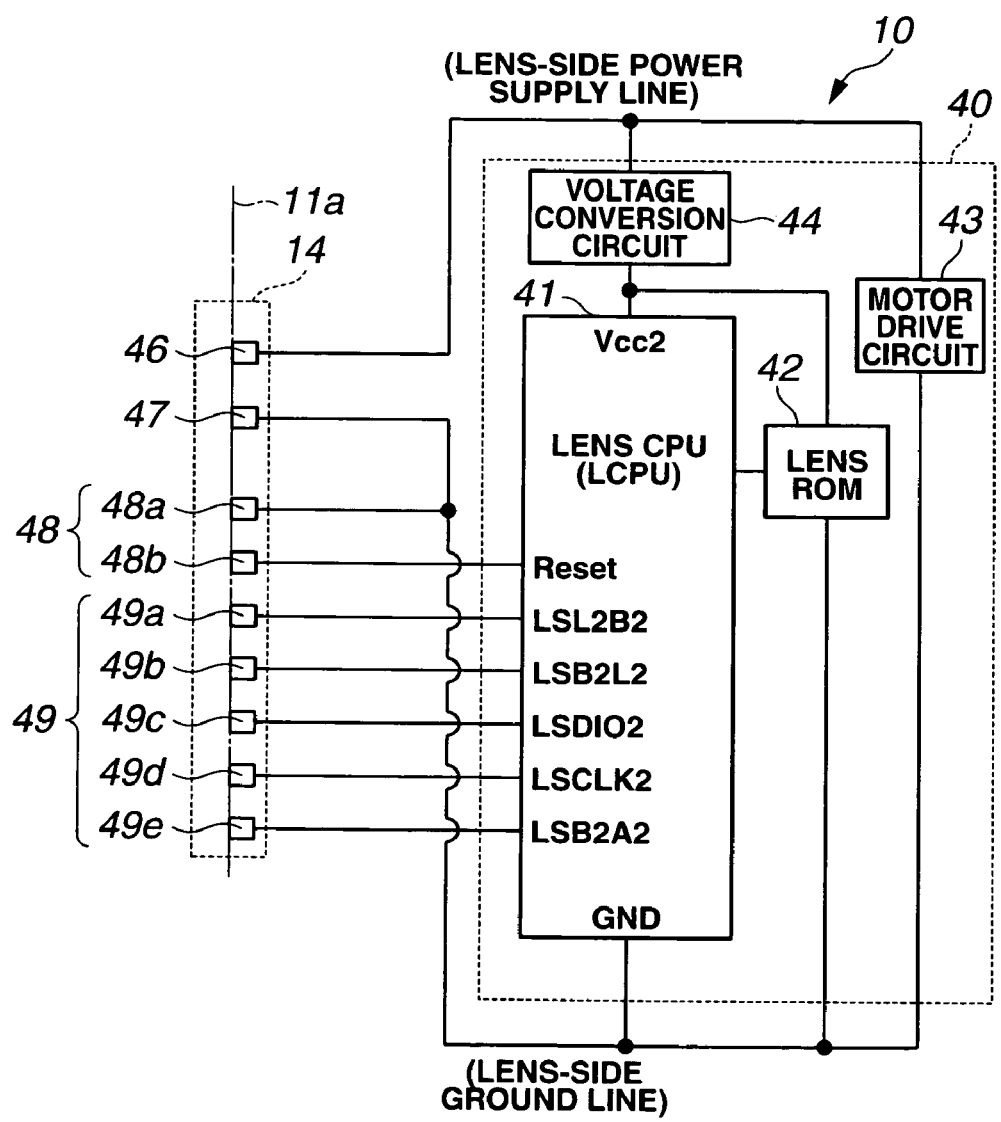
FIG. 3 is a block diagram showing the configuration of an electrical circuit of the interchangeable lens in FIG. 1.

FIG. 3 is a block diagram showing the configuration of an electrical circuit of the interchangeable lens 10 in FIG. 1.

As shown in FIG. 3, the electrical circuit of the interchangeable lens 10 mainly includes an electrical circuit 40 and the multiple lens-side terminals 14. The electrical circuit 40 includes a lens CPU (hereinafter referred to as an LCPU) 41, which is a third CPU for controlling the operation of the entire interchangeable lens 10, a lens ROM 42, a motor drive circuit 43, and a voltage conversion circuit 44. The lens ROM 42 may be included in the LCPU 41.

The LCPU 41 has a power supply terminal Vcc2, a reset terminal RESET, a start-of-lens-CPU response terminal LSL2B2, a lens communication output terminal LSB2L2, a communication data terminal LSDIO2, a communication clock terminal LSCLK2, an accessory communication request terminal LSB2A2, and a GND terminal.

The lens-side terminals 14 include the second power supply terminal 46, the second ground terminal 47, the lens-side signal terminal 48, and the lens-side communication terminal 49. The second power supply terminal 46 is used for supplying power to the LCPU 41. The lens-side signal terminal 48 includes a third signal terminal 48a used for detecting attachment of the rear converter 200 or attachment of the interchangeable lens 10 to the camera body 1 and a fourth signal terminal 48b used for receiving a reset signal through a lens reset terminal LSRST3, described below, of the ACPU 221 or through the accessory-and-lens reset terminal LSRST of the BCPU 21. The lens-side communication terminal 49 includes a sixth communication terminal 49a, a seventh communication terminal 49b, an eighth communication terminal 49c, a ninth communication terminal 49d, and a tenth communication terminal 49e, and is used for intercommunication between the BCPU 21 and the ACPU 221 or between the BCPU 21 and the LCPU 41.

When the interchangeable lens 10 is attached to the rear converter 200, of the lens-side terminals 14, the second power supply terminal 46, the second ground terminal 47, the lens-side signal terminal 48, and the lens-side communication terminal 49 are in contact with a fourth power supply terminal 246, a fourth ground terminal 247, a lens-side signal, terminal 248, and a lens-side communication terminal 249, respectively, of the rear converter 200, described below with reference to FIGS. 6 and 7. When the interchangeable lens 10 is attached to the camera body 1, the contact is established in the manner described above.

The motor drive circuit 43 is connected between a lens-side power supply line and a lens-side ground line. The lens-side power supply line is connected to the second power supply terminal 46. The lens-side ground line is connected to the second ground terminal 47 and the third signal terminal 48a.

The terminal Vcc2 of the LCPU 41 is connected to the lens-side power supply line through the voltage conversion circuit 44. The RESET terminal is connected to the fourth signal terminal 48b. The LSL2B2 terminal is connected to the sixth communication terminal 49a. The LSB2L2 terminal is connected to the seventh communication terminal 49b. The LSDIO2 terminal is connected to the eighth communication terminal 49c. The LSCLK2 terminal is connected to the ninth communication terminal 49d. The LSB2A2 terminal is connected to the tenth communication terminal 49e. The GND terminal is connected to the lens-side ground line.

The lens ROM 42 is connected between the terminal Vcc2 of the LCPU 41 and the lens-side ground line. The output terminal of the lens ROM 42 is connected to the LCPU 41. The lens ROM 42 is, for example, a non-volatile memory and stores information used for, for example, identifying the interchangeable lens 10.

The motor drive circuit 43 is a circuit for driving a motor (not shown) included in the interchangeable lens 10. The motor drive circuit 43 moves the multiple lenses 10a (see FIG. 1) for AF control in the direction of the optical axis in order to perform AF control.

The voltage conversion circuit 44 is, for example, a voltage regulator circuit. The voltage conversion circuit 44 converts power supplied from the voltage stabilizing circuit 24 of the camera body 1 so as to be supplied to the LCPU 41 and supplies the converted power to the LCPU 41 and the lens ROM 42.

In the electrical circuit 40 having the above configuration, power is supplied from the power supply circuit 23 (see FIG. 2) of the camera body 1 to the motor drive circuit 43 without passing through voltage conversion circuit 44. For control of the LCPU 41 and lens ROM 42, power is supplied through the voltage conversion circuit 44.

Figure 4:
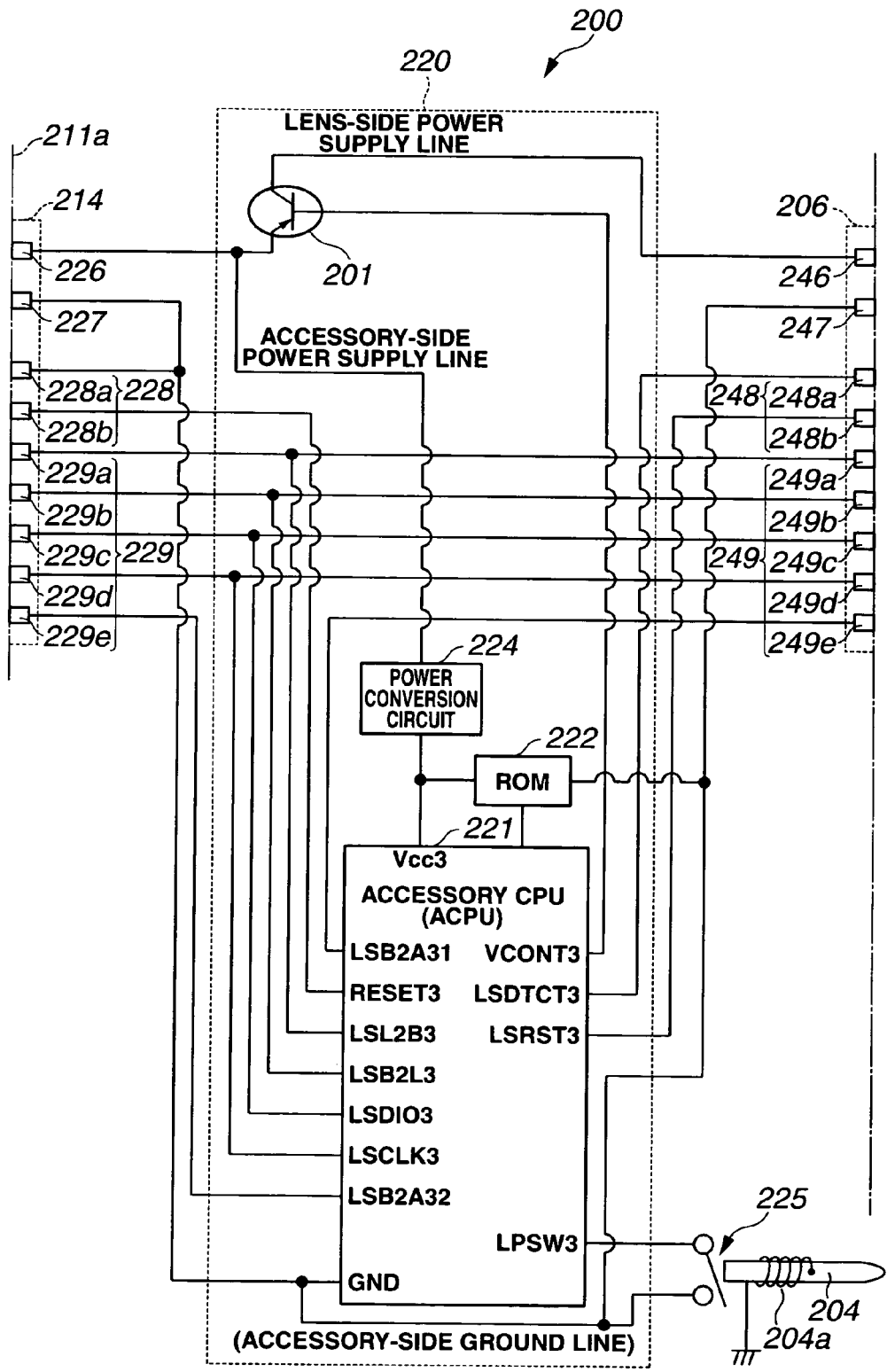
FIG. 4 is a block diagram showing the configuration of an electrical circuit of the rear converter in FIG. 1.

FIG. 4 is a block diagram showing the configuration of an electrical circuit of the rear converter 200 in FIG. 1.

As shown in FIG. 4, the electrical circuit of the rear converter 200 mainly includes an electrical circuit 220, a detection switch 225, the multiple camera-side terminals 214, and the multiple lens-side terminals 206. The electrical circuit 220 includes a transistor 201; the rear converter CPU (hereinafter referred to as the ACPU) 221, which is a second CPU for controlling the operation of the entire rear converter 200; a rear converter ROM 222 which is, for example, a non-volatile memory; and a power conversion circuit 224. The detection switch 225 is a push switch for detecting a state of the interlocking pin 204 forced by the pressure spring 204a. The rear converter ROM 222 may be included in the ACPU 221.

The ACPU 221 has a power supply terminal Vcc3, a reset terminal RESET3, a start-of-ACPU response terminal LSL2B3, a rear-converter communication request terminal LSB2A31, a lens communication output terminal LSB2L3, a communication data terminal LSDIO3, a communication clock terminal LSCLK3, an accessory communication request terminal LSB2A32, a VCONT3 used for controlling turning on/off of the transistor 201, a lens detection terminal LSDTCT3, the lens reset terminal LSRST3, a lock pin switch LPSW3, and a GND terminal.

The camera-side terminals 214 include the third power supply terminal 226 used for supplying power to the ACPU 221, the third ground terminal 227, the camera-side signal terminal 228, and the camera-side communication terminal 229. The camera-side signal terminal 228 includes a fifth signal terminal 228a used for detecting attachment of the rear converter 200 and a sixth signal terminal 228b used for receiving a reset signal from the BCPU 21. The camera-side communication terminal 229 includes an eleventh communication terminal 229a, a twelfth communication terminal 229b, a thirteenth communication terminal 229c, a fourteenth communication terminal 229d, and a fifteenth communication terminal 229e, and is used for intercommunication between the BCPU 21 and the ACPU 221.

When the rear converter 200 is attached to the camera body 1, of the camera-side terminals 214, the third power supply terminal 226, the third ground terminal 227, the camera-side signal terminal 228, and the camera-side communication terminal 229 are in contact with the first power supply terminal 26, the first ground terminal 27, the camera-side signal terminal 28, and the camera-side communication terminal 29, respectively, of the camera body 1, as described below with reference to FIGS. 5, 6, and 7.

The multiple lens-side terminals 206 include the fourth power supply terminal 246 used for supplying power to the LCPU 41, the fourth ground terminal 247, the lens-side signal terminal 248, and the lens-side communication terminal 249. The lens-side signal terminal 248 includes a seventh signal terminal 248a used for detecting attachment of the interchangeable lens 10 and an eighth signal terminal 248b used for supplying a reset signal to the LCPU 41. The lens-side communication terminal 249 includes a sixteenth communication terminal 249a, a seventeenth communication terminal 249b, an eighteenth communication terminal 249c, a nineteenth communication terminal 249d, and a twentieth communication terminal 249e, and is used for intercommunication between the ACPU 221 and the LCPU 41.

Figure 7:
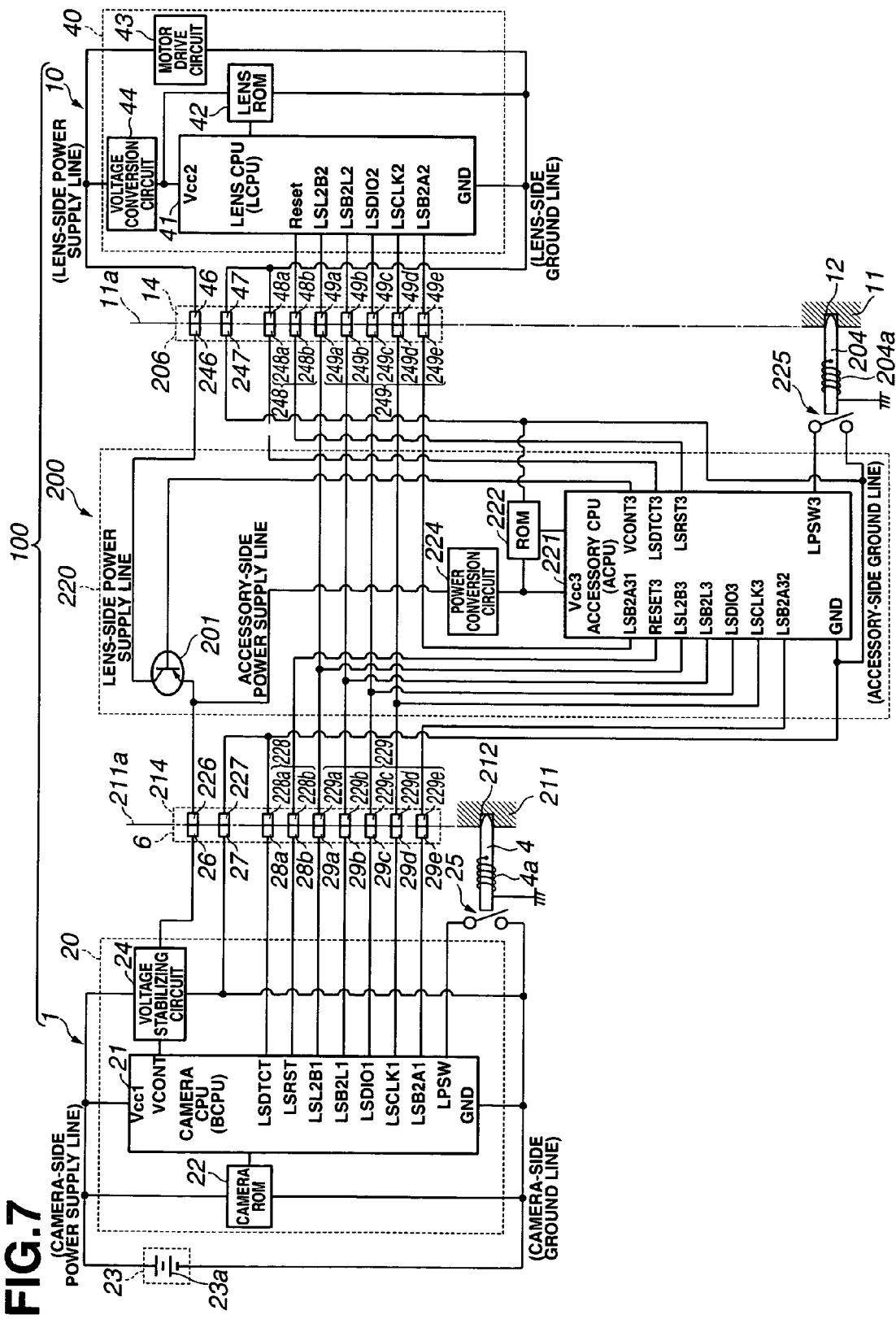
FIG. 7 is a block diagram showing the configuration of an electrical circuit of the camera system in a state after the interchangeable lens is attached to the rear converter attached to the camera body in FIG. 2.

When the interchangeable lens 10 is attached to the rear converter 200, of the multiple lens-side terminals 206, the fourth power supply terminal 246, the fourth ground terminal 247, the lens-side signal terminal 248, and the lens-side communication terminal 249 are in contact with the second power supply terminal 46, the second ground terminal 47, the lens-side signal terminal 48, and the lens-side communication terminal 49, respectively, of the interchangeable lens 10, described below with reference to FIG. 7.

The terminal Vcc3 of the ACPU 221 is connected to an accessory-side power supply line through the power conversion circuit 224. The LSB2A31 terminal is connected to the twentieth communication terminal 249e. The RESET3 terminal is connected to the sixth signal terminal 228b through a first reset line. The LSL2B3 terminal is connected to the eleventh communication terminal 229a. The LSB2L3 terminal is connected to the twelfth communication terminal 229b. The LSDIO3 terminal is connected to the thirteenth communication terminal 229c. The LSCLK3 terminal is connected to the fourteenth communication terminal 229d. The LSB2A32 terminal is connected to the fifteenth communication terminal 229e. The GND terminal is connected to an accessory-side ground line. The VCONT3 terminal is connected to the base of the transistor 201. The LSDTCT3 terminal is connected to the seventh signal terminal 248a. The LSRST3 terminal is connected to the eighth signal terminal 248b through a second reset line.

The rear converter ROM 222 is connected between the accessory-side power supply line and the accessory-side ground line. The output end of the rear converter ROM 222 is connected to the ACPU 221. The emitter of the transistor 201 is connected to the third power supply terminal 226. The collector of the transistor 201 is connected to the fourth power supply terminal 246.

The rear converter ROM 222 is, for example, a non-volatile memory and stores information for, for example, identifying the rear converter 200.

The power conversion circuit 224 is, for example, a voltage regulator circuit. The power conversion circuit 224 converts power supplied from the voltage stabilizing circuit 24 of the camera body 1 so as to be supplied to the ACPU 221 and supplies the converted power to the ACPU 221 and the rear converter ROM 222.

The transistor 201 supplies or shuts off a power output from the voltage stabilizing circuit 24 of the camera body 1 to the interchangeable lens 10 through the lens-side power supply line, which is a power supply line.

When the interchangeable lens 10 is not attached to the rear converter 200, the interlocking pin 204 is forced by the pressure spring 204a. As a result, the front end of the interlocking pin 204 extends forward from the rear-converter-side mount surface 202a and the back end of the interlocking pin 204 is positioned in front of and apart from the detection switch 225. Accordingly, the detection switch 225, which is the push switch, is in a third state, that is, in the OFF state.

The detection switch 225, which is the push switch, detects whether the interchangeable lens 10 is attached to the rear converter 200. Specifically, the detection switch 225 detects whether the interlocking pin 204 forced by the pressure spring 204a is in the OFF state, which is the third state, or in the ON state, which is a fourth state.

Next, a method will be described for supplying power to the rear converter 200 and the interchangeable lens 10 in the interchangeable lens type camera system 100 according to the embodiment of the invention by using the camera body 1, the rear converter 200, and the interchangeable lens 10 having the above structures.

Figure 5:
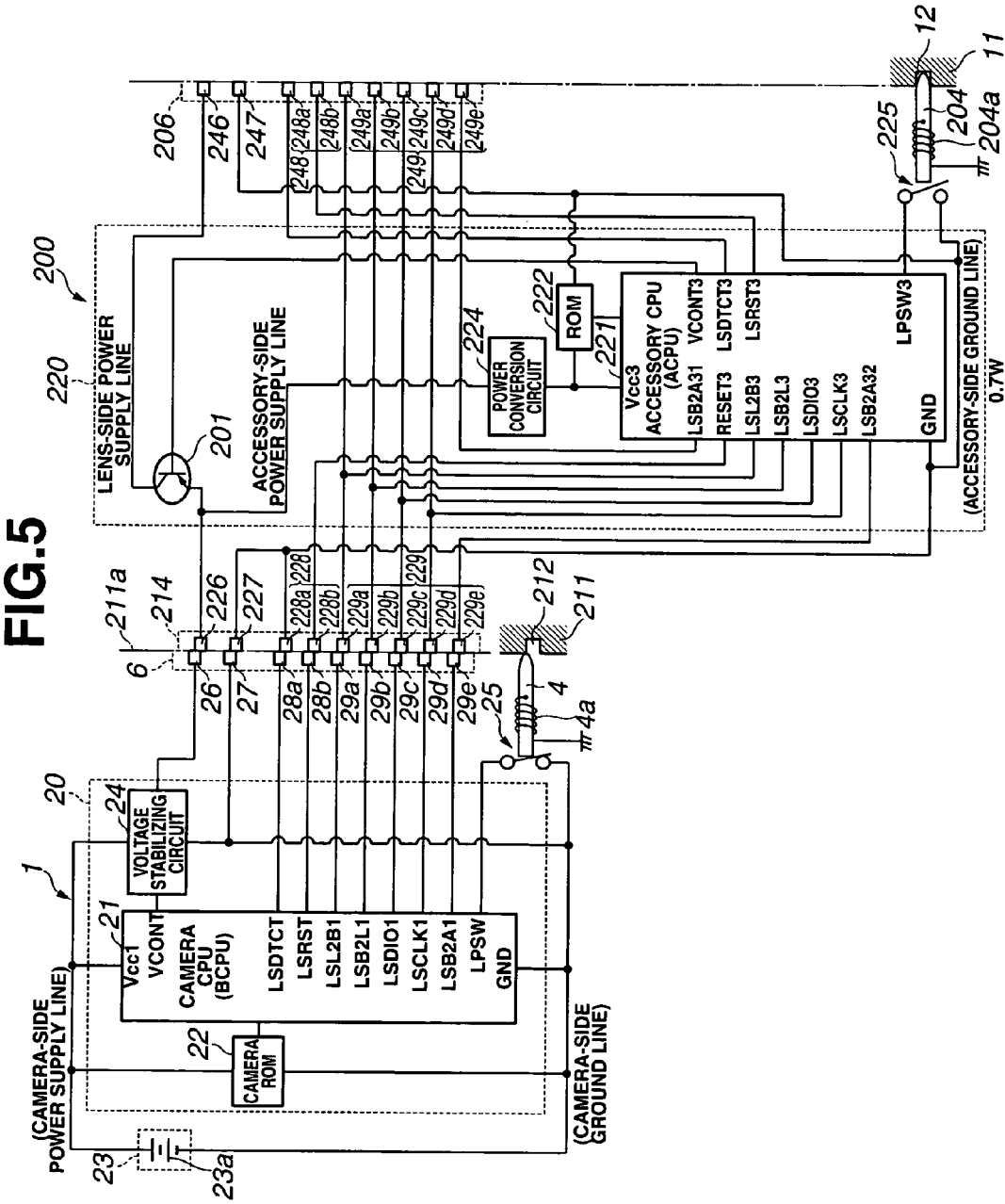
FIG. 5 is a block diagram showing the configuration of an electrical circuit of the interchangeable lens type camera system in a state immediately before an interlocking pin is fitted into an engaging hole after the rear converter in FIG. 4 is attached to the camera body 1 in FIG. 2.

FIG. 5 is a block diagram showing the configuration of an electrical circuit of the interchangeable lens type camera system 100 in a state immediately before the interlocking pin 4 is fitted into the engaging hole 212 after the rear converter 200 in FIG. 4 is attached to the camera body 1 in FIG. 2. FIG. 6 is a block diagram showing the configuration of an electrical circuit of the interchangeable lens type camera system 100 in a state immediately before the interlocking pin 204 is fitted into the engaging hole 12 after the interchangeable lens 10 in FIG. 3 is attached to the rear converter 200 in FIG. 4 after attaching the rear converter 200 to the camera body 1. FIG. 7 is a block diagram showing the configuration of an electrical circuit of the interchangeable lens type camera system 100 in a state after the interlocking pin 4 is fitted in the engaging hole 212 after the rear converter 200 is attached to the camera body 1 in FIG. 2 and in a state after the interlocking pin 204 is fitted in the engaging hole 12 after the interchangeable lens 10 is attached to the rear converter 200 in FIG. 4.

Figure 8:
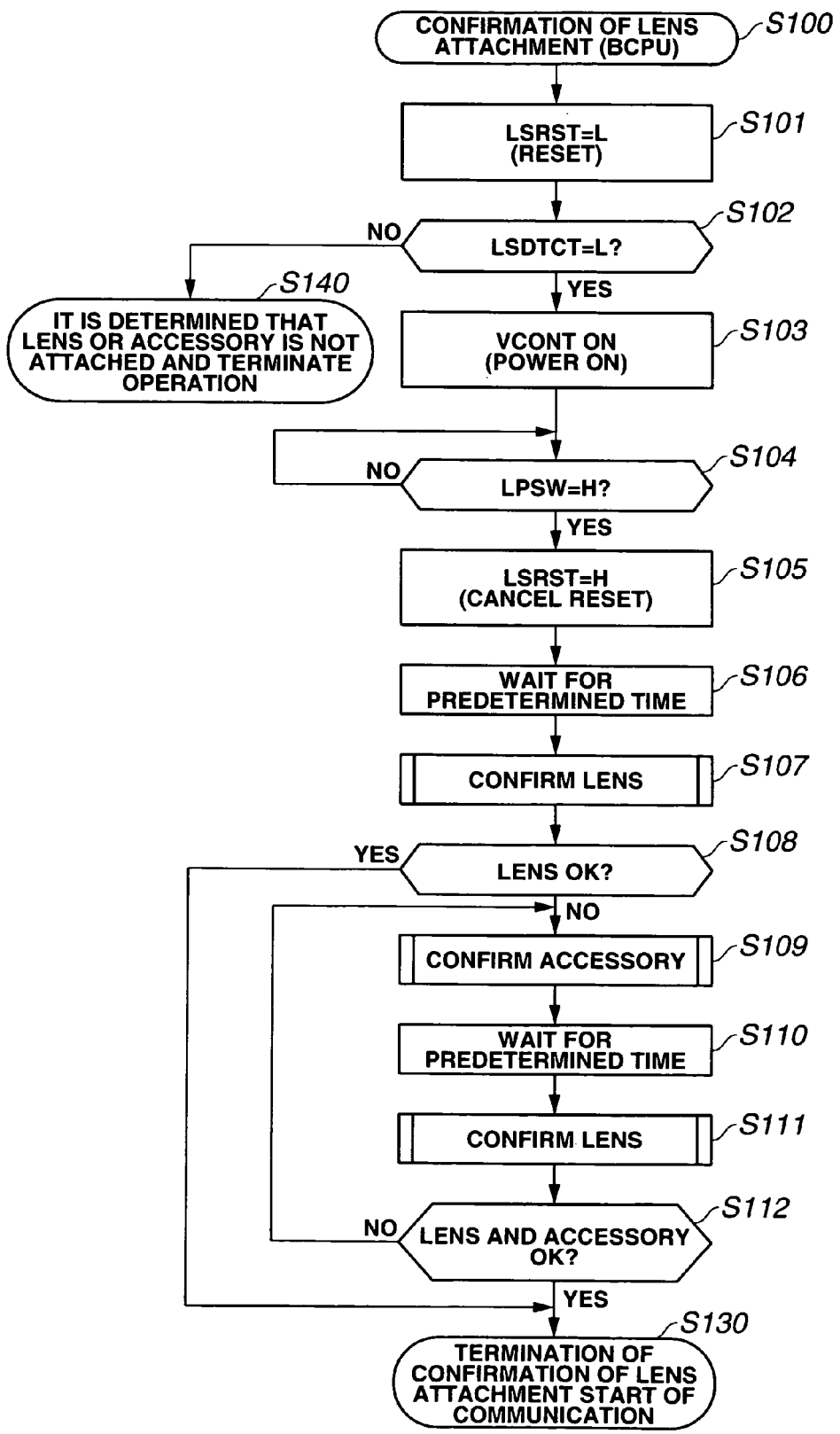
FIG. 8 is a flowchart showing an attachment confirmation operation of a BCPU in the attachment of the rear converter or the interchangeable lens to the camera body in FIG. 2.
Figure 13:
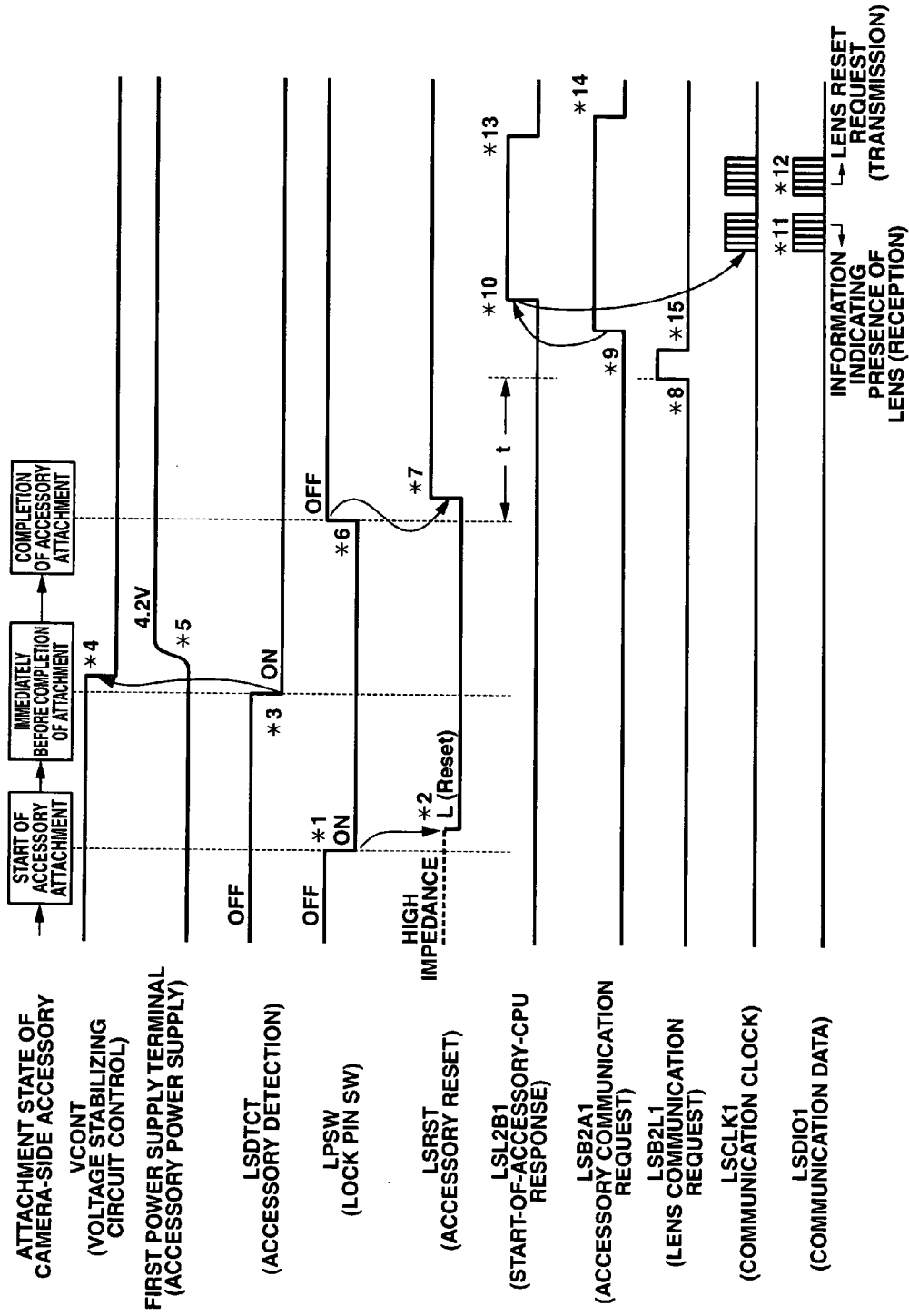
FIG. 13 is a timing chart showing an operation of the BCPU of the camera body before and after the attachment of the rear converter in FIG. 4.

FIG. 8 is a flowchart showing an attachment confirmation operation of the BCPU 21 in the attachment of the rear converter 200 or the interchangeable lens 10 to the camera body 1. FIG. 13 is a timing chart showing an operation of the BCPU 21 of the camera body 1 before and after the attachment of the rear converter 200. FIG. 14 is a timing chart showing an operation of the ACPU 221 of the rear converter 200 before and after the attachment of the interchangeable lens 10.

Figure 6:
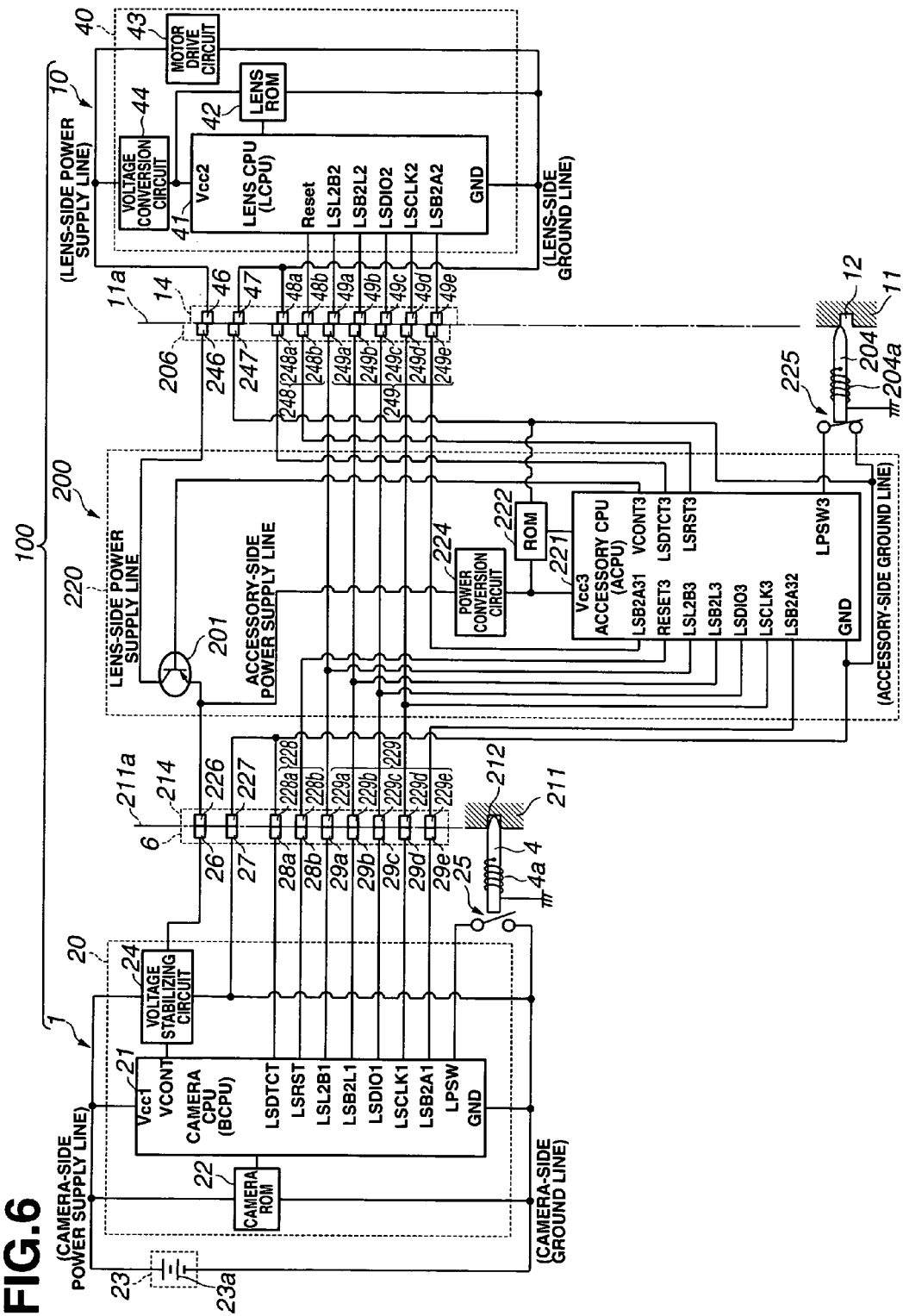
FIG. 6 is a block diagram showing the configuration of an electrical circuit of the interchangeable lens type camera system in a state immediately before an interlocking pin is fitted into an engaging hole after the interchangeable lens in FIG. 3 is attached to the rear converter in FIG. 4.

As shown in FIG. 8, in the interchangeable lens type camera system 100, the back end of the interlocking pin 4 presses the detection switch 25 to switch the detection switch 25 from the OFF state being the first state to the ON state being the second state, as shown in FIG. 5 or 6, in a state where the attachment of the rear converter 200 or the interchangeable lens 10 to the camera body 1 is started. This state corresponds to a state where the three bayonet pawls 213 (see FIG. 1) of the rear converter 200 or the three bayonet pawls 13 (see FIG. 1) of the interchangeable lens 10 are engaged with the three bayonet pawl engaging portions 5 (see FIG. 1) of the camera body 1 and where the interlocking pin 4 is pressed against the rear-converter-side mount 211 of the rear converter 200 or the lens-side mount portion 11 of the interchangeable lens 10 to retract the interlocking pin 4 toward the camera-side mount 2. In this ON state, the lock pin switch terminal LPSW of the BCPU 21 is switched from the OFF state to the ON state (*1 in FIG. 13).

In response to the ON state of the LPSW, in Step S101, the BCPU 21 outputs an L (low) signal, which is a reset signal, through the accessory-and-lens reset terminal LSRST in a high-impedance state (*2 in FIG. 13). Since the camera-side terminals 6 have not been in contact with the camera-side terminals 214 of the rear converter 200 or the lens-side terminals 14 of the interchangeable lens 10 in this state, the reset signal is not transmitted to the ACPU 221 or to the LCPU 41 through the accessory-and-lens reset terminal LSRST.

Next, in a state immediately before the attachment of the rear converter 200 or the interchangeable lens 10 to the camera body 1 is completed, that is, in a state where the rear converter 200 or the interchangeable lens 10 is slidably rotated in one direction to rotate the rear-converter-side mount 211 or the lens-side mount 11 with being pressed against the interlocking pin 4 and the detection switch 25 is in the ON state immediately before the interlocking pin 4 is fitted into the engaging hole 212 or the engaging hole 12, as shown in FIG. 5, the camera-side terminals 6 is in contact with the camera-side terminals 214 of the rear converter 200 or the lens-side terminals 14 of the interchangeable lens 10. At this time, since the second signal terminal 28b in the camera-side terminals 6 is in contact with the sixth signal terminal 228b in the camera-side terminals 214 or the fourth signal terminal 48b in the lens-side terminals 14, the reset signal continuously output through the accessory-and-lens reset terminal LSRST of the BCPU 21 is supplied to the reset terminal RESET3 of the ACPU 221 or the reset terminal RESET of the of the LCPU 41 to reset the ACPU 221 or the LCPU 41. Then, the BCPU 21 proceeds to Step S102.

In Step S102, when the first signal terminal 28a in the camera-side terminals 6 is in contact with the fifth signal terminal 228a in the camera-side terminals 214 of the rear converter 200 or the third signal terminal 48a in the lens-side terminals 14 of the interchangeable lens 10, the first signal terminal 28a and the fifth signal terminal 228a or the third signal terminal 48a are grounded (GND). This GND state is detected through the lens detecting terminal LSDTCT of the BCPU 21, connected to the first signal terminal 28a. If the lens detecting terminal LSDTCT is not at an L (low) level, the BCPU 21 braches to Step S140. In Step S140, the BCPU 21 determines that the rear converter 200 or the interchangeable lens 10 is not attached to the camera body 1 and returns the operation. If the lens detecting terminal LSDTCT is at the L level (*3 in FIG. 13), the BCPU 21 proceeds to Step S103.

In Step S103, the BCPU 21 outputs an operational signal through the voltage-stabilizing-circuit control terminal VCONT (*4 in FIG. 13). As a result, an operating voltage of, for example, 4.2 V is started to be supplied from the power supply circuit 23 to the first power supply terminal 26 in the camera-side terminals 6, connected to the terminal VCONT through the voltage stabilizing circuit 24 (*5 in FIG. 13). In other words, power is supplied while the reset signal is being output to the ACPU 221 or LCPU 41. Then, the BCPU 21 proceeds to Step S104.

In Step S104, the BCPU 21 determines whether the attachment of the rear converter 200 or the interchangeable lens 10 to the camera body 1 is completed. Specifically, the BCPU 21 determines whether the three bayonet pawls 213 of the rear converter 200 or the three bayonet pawls 13 of the interchangeable lens 10 are engaged with the three bayonet pawl engaging portions 5, whether the rear converter 200 or the interchangeable lens 10 is fixed to the camera body 1, and whether the interlocking pin 4 is fitted in the engaging hole 212 or the engaging hole 12. In other words, since the interlocking pin 4 is forced by the pressure spring 4a to extend into the engaging hole 212 or the engaging hole 12, the BCPU 21 detects whether the detection switch 25 is switched from the ON state, which is the second state according to the embodiment of the present invention, to the OFF state, which is the first state according to the embodiment of the present invention. Specifically, the BCPU 21 repeats the detection until the lock pin switch terminal LPSW of the BCPU 21 is at an H (high) level. If the lock pin switch terminal LPSW is at the H level (*6 in FIG. 13), that is, if the detection switch 25 is switched from the ON state to the OFF state, as shown in FIG. 6, the BCPU 21 proceeds to Step S105.

In Step S105, in response to the OFF state of the lock pin switch terminal LPSW, the BCPU 21 switches the reset signal output through the accessory-and-lens reset terminal LSRST to the H level (*7 in FIG. 13) after clocking a predetermined time, which is set in view of the chattering time of the switch, by using a timer (not shown). In other words, the BCPU 21 cancels the reset state of the ACPU 221 or the LCPU 41 to operate the ACPU 221 or the LCPU 41. Then, the BCPU 21 proceeds to Step S106.

In Step S106, the BCPU 21 waits for stabilization of the operation of the ACPU 221 or the LCPU 41 after the reset is canceled. Proceeding to Step S107, the BCPU 21 outputs an H (high) signal through the lens communication request terminal LSB2L1 to detect a state of the start-of-lens-CPU response terminal LSL2B1 in Step S107. Then, the BCPU 21 proceeds to Step S108.

In Step S108, if the BCPU 21 detects a reaction of the LSL2B1 in Step S107, that is, if a response is transmitted through the start-of-lens-CPU response terminal LSL2B2 of the LCPU 41, the BCPU 21 determines that the interchangeable lens 10 is attached to the camera body 1 and jumps to Step S130 to terminate the lens attachment confirmation. The BCPU 21 starts to communicate with the LCPU 41. If the BCPU 21 does not detect a reaction of the LSL2B1, the BCPU 21 proceeds to Step S109.

In Step S109, in order to determine whether the rear converter 200 is attached to the camera body 1, the BCPU 21 outputs the H signal through the accessory communication request terminal LSB2A1 (*9 in FIG. 13) to detect a state of the start-of-lens-CPU response terminal LSL2B1. If the BCPU 21 detects a reaction of the LSL2B1 (*10 in FIG. 13), that is, if a response is transmitted through the start-of-ACPU response terminal LSL2B3 of the ACPU 221, the BCPU 21 determines that the rear converter 200 is attached to the camera body 1 and proceeds to Step S110.

In Step S110, the BCPU 21 waits for a predetermined time. Proceeding to Step S111, the BCPU 21 outputs the H signal through the lens communication request terminal LSB2L1 to detect a state of the start-of-lens-CPU response terminal LSL2B1 in Step S111, and proceeds to Step S112.

In Step S112, if the BCPU 21 detects a reaction of the LSL2B1 in Step S111, that is, if a response is transmitted through the start-of-lens-CPU response terminal LSL2B2 of the LCPU 41, the BCPU 21 determines that the interchangeable lens 10 is attached to the rear converter 200 and jumps to Step S130 to terminate the lens attachment confirmation. The BCPU 21 starts to communicate with the LCPU 41. If the BCPU 21 does not detect a reaction of the LSL2B1, the BCPU 21 determines that the interchangeable lens 10 is not attached to the rear converter 200 and goes back to Step S109.

Figure 9:
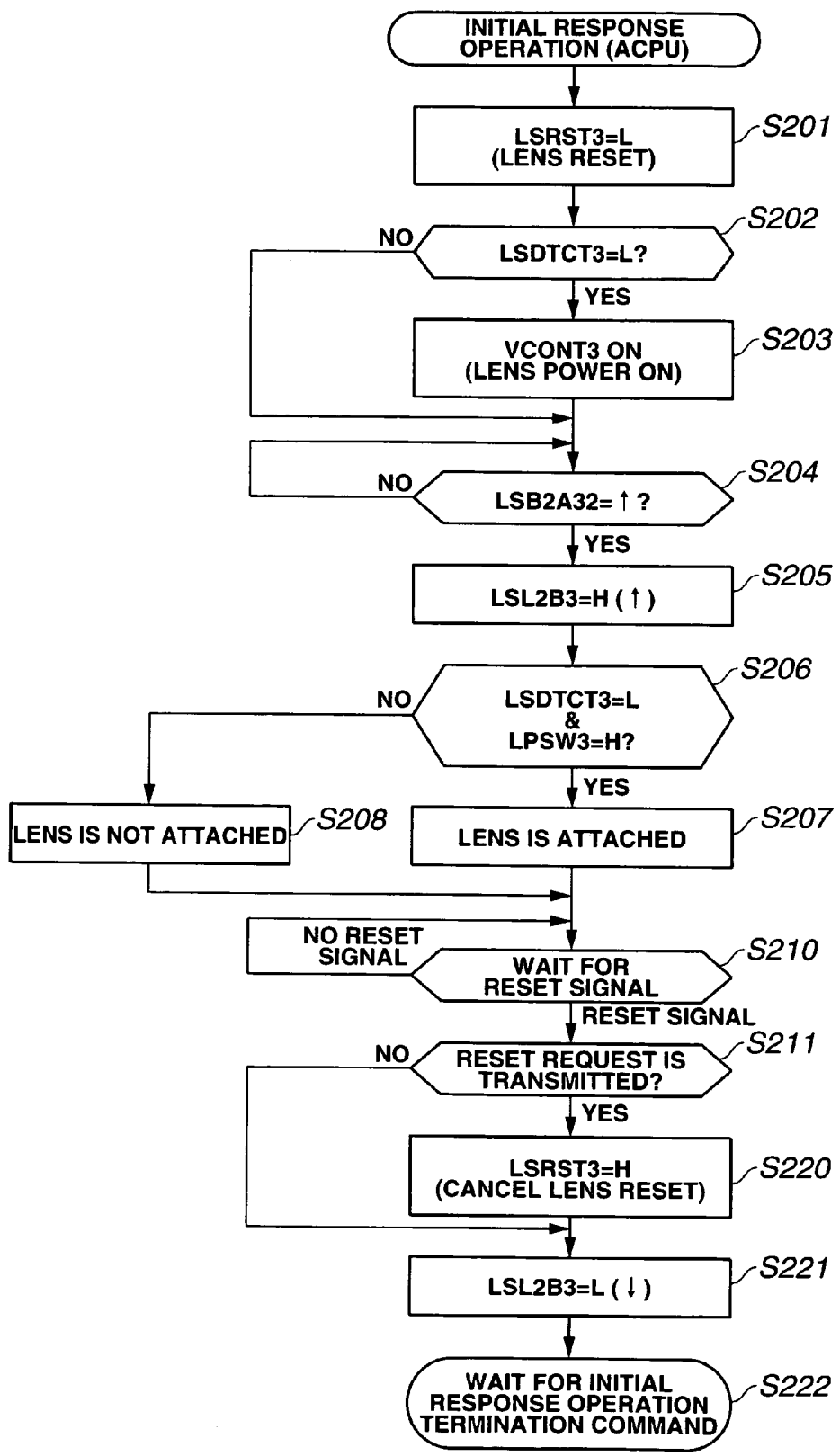
FIG. 9 is a flowchart showing an initial response operation of an ACPU when the rear converter in FIG. 4 is attached to the camera body.
Figure 10:
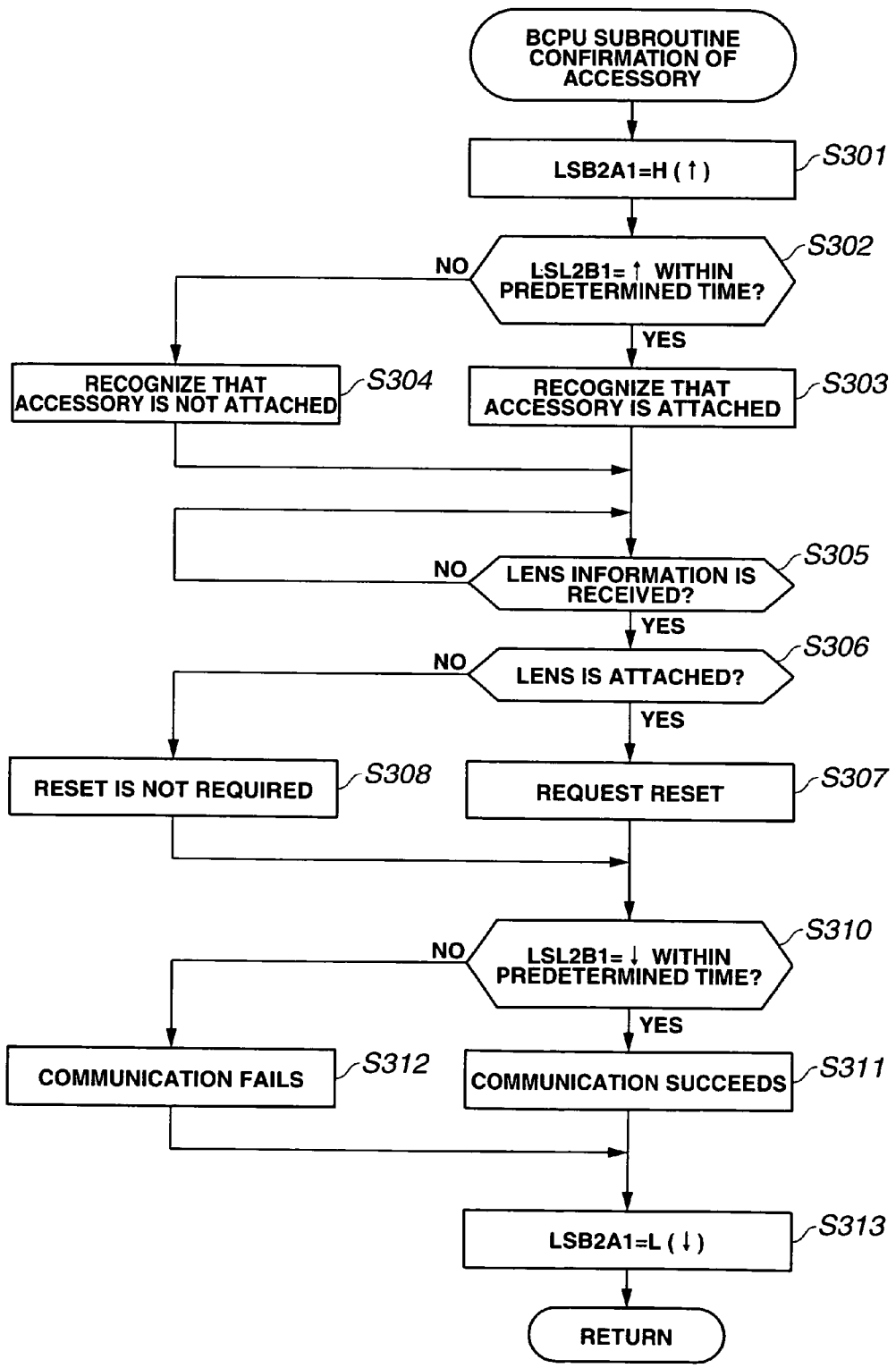
FIG. 10 is a flowchart showing a confirmation operation of attachment of the interchangeable lens by the BCPU when the rear converter or the interchangeable lens in FIG. 4 is attached to the camera body.

Next, a confirmation operation of attachment of the rear converter 200 by the BCPU 21 and an initial response operation of the ACPU 221 corresponding to the operation of the BCPU 21 will be described in detail. FIG. 9 is a flowchart showing the initial response operation of the ACPU 221 when the rear converter 200 is attached to the camera body 1. FIG. 10 is a flowchart showing the confirmation operation of attachment of the interchangeable lens by the BCPU 21 when the rear converter 200 or the interchangeable lens 10 is attached to the camera body 1.

After power is supplied to the rear converter 200 in Step S103 in FIG. 8 (*5 in FIG. 13), the attachment of the rear converter 200 to the camera body 1 is completed in Step S104, and the reset state of the ACPU 221 is canceled in Step S105 (*7 in FIG. 13), in the interchangeable lens type camera system 100, the back end of the interlocking pin 204 presses the detection switch 225 to switch the detection switch 225 from the OFF state being the third state to the ON state being the fourth state, as shown in FIG. 6, in a state where the attachment of the interchangeable lens 10 to the rear converter 200 is started. This state corresponds to a state where the three bayonet pawls 13 (see FIG. 1) of the interchangeable lens 10 are engaged with the three bayonet pawl engaging portions 205 (see FIG. 1) of the rear converter 200 and where the interlocking pin 204 is pressed against the lens-side mount 11 of the interchangeable lens 10 to retract the interlocking pin 204 toward the rear-converter-side mount 202 of the rear converter 200. In this ON state, the lock pin switch terminal LPSW3 of the ACPU 221 is switched from the OFF state to the ON state (*20 in FIG. 14).

In response to the ON state of the LPSW3, in Step S201, the ACPU 221 outputs the L (low) signal, which is a reset signal, through the lens reset terminal LSRST3 in the high-impedance state (*21 in FIG. 14). Since the lens-side terminals 206 of the rear converter 200 have not been in contact with the lens-side terminals 14 of the interchangeable lens 10 in this state, the reset signal is not transmitted from the lens reset terminal LSRST3 to the LCPU 41.

Next, in a state immediately before the attachment of the interchangeable lens 10 to the rear converter 200 is completed, that is, in a state where the interchangeable lens 10 is slidably rotated in one direction to rotate the lens-side mount 11 with being pressed against the interlocking pin 204 and the detection switch 225 is in the ON state immediately before the interlocking pin 204 is fitted into the engaging hole 12, as shown in FIG. 6, the lens-side terminals 206 of the rear converter 200 is in contact with the lens-side terminals 14 of the interchangeable lens 10. At this time, since the eighth signal terminal 248b in the lens-side terminals 206 is in contact with the fourth signal terminal 48b in the lens-side terminals 14 of the interchangeable lens 10, the reset signal continuously output through the lens reset terminal LSRST3 of the ACPU 221 is supplied to the reset terminal RESET of the of the LCPU 41 to reset the LCPU 41. Then, the ACPU 221 proceeds to Step S202.

In Step S202, when the seventh signal terminal 248a in the lens-side terminals 206 of the rear converter 200 is in contact with the third signal terminal 48a in the lens-side terminals 14 of the interchangeable lens 10, the seventh signal terminal 248a and the third signal terminal 48a are grounded (GND). This GND state is detected through the lens detection terminal LSDTCT3 of the ACPU 221, connected to the seventh signal terminal 248a. If the lens detection terminal LSDTCT3 is not at the L (low) level, the ACPU 221 jumps to Step S204. If the lens detection terminal LSDTCT3 is at the L level (*22 in FIG. 14), the ACPU 221 proceeds to Step S203.

In Step S203, the ACPU 221 outputs an operational signal through the voltage-stabilizing-circuit control terminal VCONT3 (*23 in FIG. 14). As a result, an operating voltage of, for example, 4.2 V is started to be supplied from the power supply circuit 23 to the fourth power supply terminal 246 in the lens-side terminals 206, connected to the terminal VCONT3 through the transistor 201 (*24 in FIG. 14). In other words, power is supplied while the reset signal is being output to the LCPU 41. Then, the ACFIJ 221 proceeds to Step S204.

In Step S204, in response to the H level of the accessory communication request terminal LSB2A1 of the BCPU 21 (*9 in FIG. 13), the ACPU 221 repeats this step until the signal of the accessory communication request terminal LSB2A32 of the ACPU 221 rises (*25 in FIG. 14). Proceeding to Step S205, the ACPU 221 indicates to the start-of-lens-CPU response terminal LSL2B1 of the BCPU 21 that the LSB2A32 is at the H level, that is, that the rear converter 200 is attached to the camera body 1, by setting the start-of-ACPU response terminal LSL2B3 to the H level (*26 in FIG. 14) in Step S205. Then, the ACPU 221 proceeds to Step S206.

In Step S206, the ACPU 221 determines whether the lens detection terminal LSDTCT3 of the ACPU 221 is at the L level and the lock pin switch LPSW3 is at the H level. If the lens detection terminal LSDTCT3 is not at the L level and the lock pin switch LPSW3 is not at the H level, the ACPU 221 braches to Step S208. In Step S208, the ACPU 221 determines that the interchangeable lens 10 is not attached to the rear converter 200 and transmits information indicating that the interchangeable lens 10 is not attached to the BCPU 21 through the communication data terminal LSDIO3 (*27 in FIG. 14). Then, the ACPU 221 proceeds to Step S210.

If the lens detection terminal LSDTCT3 is at the L level and the lock pin switch LPSW3 is at the H level in Step S206, the ACPU 221 proceeds to Step S207. In Step S207, the ACPU 221 determines that the interchangeable lens 10 is attached to the rear converter 200 and transmits information indicating that the interchangeable lens 10 is attached to the BCPU 21 through the communication data terminal LSDIO3 (*27 in FIG. 14). Then, the ACPU 221 proceeds to Step S210.

In Step S210, the ACPU 221 waits for a reset signal for the LCPU 41 of the interchangeable lens 10 to be transmitted from the BCPU 21. Proceeding to Step S211, the ACPU 221 determines whether the signal indicating the presence of the request to reset the LCPU 41 of the interchangeable lens 10 is transmitted from the BCPU 21 in Step S211. If the signal of the reset request is not received, the ACPU 221 jumps to Step S221. If the signal of the reset request is received (*28 in FIG. 14), the ACPU 221 proceeds to Step S220.

In Step S220, the ACPU 221 confirms that the lens reset terminal LSRST3 is at the H level, that is, that the reset state of the LCPU 41 is canceled (*29 in FIG. 14). Proceeding to Step S221, the ACPU 221 sets the start-of-ACPU response terminal LSL2B3 to the L level (*30 in FIG. 14) and indicates to the BCPU 21 the success in the communication with the BCPU 21 in Step S221. Then, proceeding to Step S222, the ACPU 221 waits for an initial-response-operation termination command.

While the ACPU 221 performs the operation shown in FIG. 9, the BCPU 21 of the camera body 1 performs the confirmation operation shown in FIG. 10. Referring to FIG. 10, in Step S301, the BCPU 21 outputs the H signal through the accessory communication request terminal LSB2A1 (*9 in FIG. 13) in order to determine whether the rear converter 200 is attached to the camera body 1. Then, the BCPU 21 proceeds to Step S302.

In Step S302, the BCPU 21 detects whether the start-of-ACPU response terminal LSL2B3 of the ACPU 221 is switched to the H level within a predetermined time (*10 in FIG. 13). If the LSL2B1 is not at the H level, the BCPU 21 branches to Step S304 to recognize that the rear converter 200 is not attached to the camera body 1 and proceeds to Step S305. If the LSL2B1 is at the H level, the BCPU 21 proceeds to Step S303 to recognize that the rear converter 200 is attached to the camera body 1 and proceeds to Step S305.

In Step S305, the BCPU 21 receives the information indicating that the interchangeable lens 10 is not attached or the information indicating that the interchangeable lens 10 is attached, which has been transmitted from the ACPU 221 through the communication data terminal LSDIO3, through the communication data terminal LSDIO1 (*11 in FIG. 13) and proceeds to Step S306.

In Step S306, the BCPU 21 determines whether the interchangeable lens 10 is attached to the rear converter 200 on the basis of the information received in Step S305. If the interchangeable lens 10 is not attached to the rear converter 200, the BCPU 21 braches to Step S308 to transmit a signal indicating that the resetting of the LCPU 41 of the interchangeable lens 10 is not required to the ACPU 221 through the communication data terminal LSDIO1 (*12 in FIG. 13) and then proceeds to Step S310.

Meanwhile, if the BCPU 21 determines in Step S306 that the interchangeable lens 10 is attached to the rear converter 200, in Step S307, the BCPU 21 transmits a signal indicating that the LCPU 41 of the interchangeable lens 10 is to be reset to the ACPU 221 through the communication data terminal LSDIO1 (*12 in FIG. 13) and then proceeds to Step S310.

In Step S310, in response to the L level of the start-of-ACPU response terminal LSL2B3 of the ACPU 221, the BCPU 21 determines whether the start-of-lens-CPU response terminal LSL2B1 is switched to the L level within a predetermined time, that is, whether the communication with the rear converter 200 succeeds. If the start-of-lens-CPU response terminal LSL2B1 is not switched to the L level within the predetermined time, the BCPU 21 braches to Step S312 to determine that the communication fails and proceeds to Step S313.

Meanwhile, if the start-of-lens-CPU response terminal LSL2B1 is switched to the L level within the predetermined time (*13 in FIG. 13), the BCPU 21 proceeds to Step S311 to determine that the communication succeeds and proceeds to Step S313.

In Step S313, the BCPU 21 confirms that the accessory communication request terminal LSB2A1 is at the L level (*14 in FIG. 13). That is, the BCPU 21 terminates the communication with the ACPU 221 and then returns.

Figure 11:
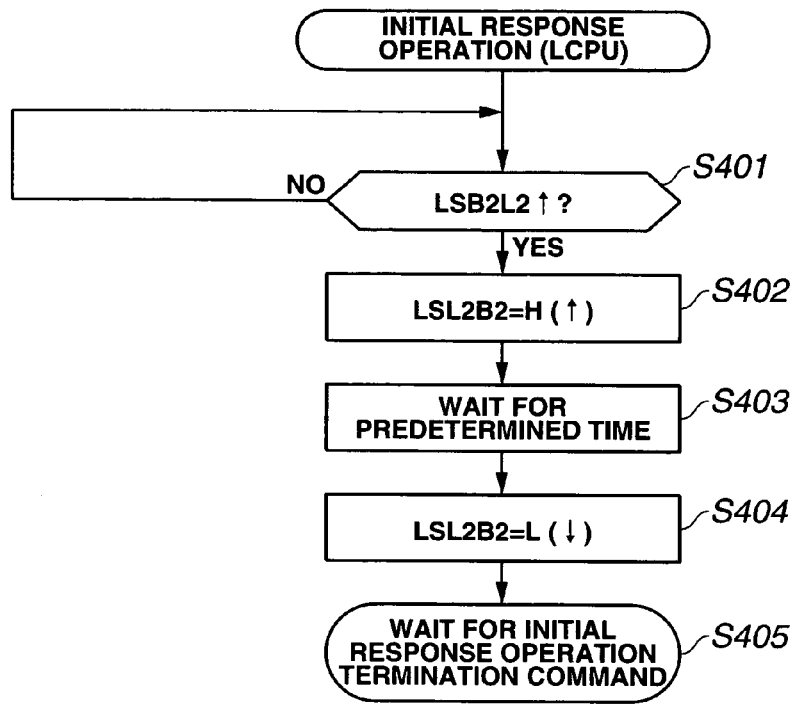
FIG. 11 is a flowchart showing an initial response operation of an LCPU when the interchangeable lens in FIG. 3 is attached to the rear converter.
Figure 12:
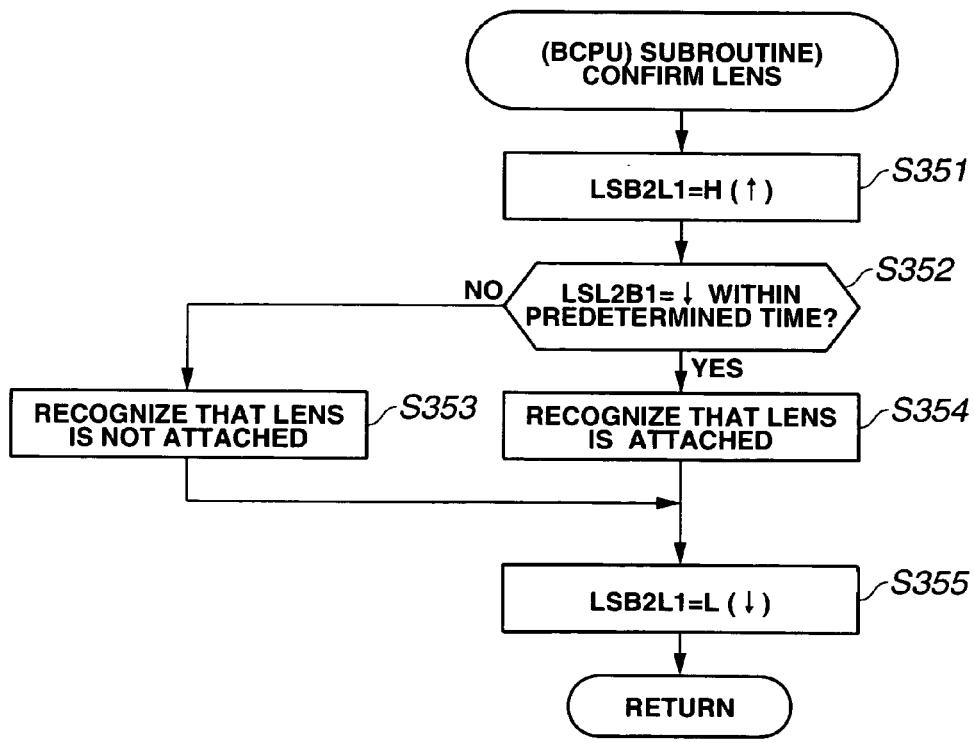
FIG. 12 is a flowchart showing a confirmation operation of attachment of the interchangeable lens by the BCPU when the rear converter to which the interchangeable lens in FIG. 3 is attached is attached to the camera body.

Next, a confirmation operation of attachment of the interchangeable lens 10 to the rear converter 200 by the BCPU 21 and an initial response operation of the LCPU 41 corresponding to the operation of the BCPU 21 will be described in detail. FIG. 11 is a flowchart showing the initial response operation of the LCPU 41 when the interchangeable lens 10 is attached to the rear converter 200. FIG. 12 is a flowchart showing the confirmation operation of attachment of the interchangeable lens by the BCPU 21 when the interchangeable lens 10 is attached to the rear converter 200.

After the reset signal output through the accessory-and-lens reset terminal LSRST of the BCPU 21 is switched to the H level (*7 in FIG. 13) in Step S105 in FIG. 8, that is, after the reset state of the ACPU 221 is canceled to start the operation of the ACPU 221; or after the lens reset terminal LSRST3 of the ACPU 221 is switched to the H level in Step S220 in FIG. 9, that is, after it is confirmed that the reset state of the LCPU 41 is canceled (*29 in FIG. 14), in Step S401, the LCPU 41 of the interchangeable lens 10 repeats the step until the signal of the lens communication output terminal LSB2L2 rises in response to the H signal output through the lens communication request terminal LSB2L1 of the BCPU 21 (*8 in FIG. 13) and proceeds to Step S402.

In Step S402, the LCPU 41 indicates to the BCPU 21 that the start-of-lens-CPU response terminal LSL2B2 is at the H level. That is, the LCPU 41 indicates to the BCPU 21 that the LCPU 41 is in a preliminary phase of the communication-ready state and proceeds to Step S403.

In Step S403, the LCPU 41 waits for the communication with the BCPU 21 for a predetermined time. Proceeding to Step S404, the LCPU 41 indicates to the BCPU 21 that the start-of-lens-CPU response terminal LSL2B2 is at the L level in Step S404. That is, the LCPU 41 indicates to the BCPU 21 that the LCPU 41 is in the communication-ready state. Then, proceeding to Step S405, finally the LCPU 41 terminates the initial response operation and waits for a command in Step S405.

While the LCPU 41 performs the operation shown in FIG. 11, the BCPU 21 of the camera body 1 performs the confirmation operation shown in FIG. 12. Referring to FIG. 12, in Step S351, the BCPU 21 indicates to the LCPU 41 that the lens communication request terminal LSB2L1 is at the H level (*8 in FIG. 13) and proceeds to Step S352.

In Step S352, the BCPU 21 determines whether the LCPU 41 has indicated within a predetermined time that the start-of-lens-CPU response terminal LSL2B2 is switched to the L level on the basis of whether the signal of the start-of-lens-CPU response terminal LSL2B1 rises within the predetermined time. If the signal of start-of-lens-CPU response terminal LSL2B2 does not rise, the BCPU 21 branches to Step S353. In Step S353, the BCPU 21 recognizes that the interchangeable lens 10 is not attached to the rear converter 200 attached to the camera body 1 and proceeds to Step S355.

Meanwhile, if the signal of the start-of-lens-CPU response terminal LSL2B1 rises in Step S352, the BCPU 21 proceeds to Step S354 to recognize that the interchangeable lens 10 is attached to the rear converter 200 attached to the camera body 1 and then proceeds to Step S355.

In Step S355, the BCPU 21 indicates to the LCPU 41 that the lens communication request terminal LSB2L1 is at the L level, terminates the communication request to the LCPU 41, and then returns.

As described above, in the interchangeable lens type camera system 100 according to the embodiment of the present invention, the BCPU 21 surely resets the ACPU 221 of the rear converter 200 on the basis of the detection of the ON state of the detection switch 25 by using the interlocking pin 4, which detection is performed by the BCPU 21 of the camera body 1, and then power is supplied from the camera body 1 to the rear converter 200, and subsequently cancels the reset state of the ACPU 221.

After the reset state is canceled by the BCPU 21, the ACPU 221 surely resets the LCPU 41 of the interchangeable lens 10 on the basis of the detection of the ON state of the detection switch 225 by using the interlocking pin 204, which detection is performed by the ACPU 221 of the rear converter 200, and then power is supplied from the camera body 1 to the interchangeable lens 10, and subsequently cancels the reset stat of the LCPU 41.

Accordingly, when the interchangeable lens 10 or the rear converter 200 is attached to the camera body 1, or when the rear converter 200 to which the interchangeable lens 10 is attached is attached to the camera body 1, it is possible to prevent failure of the ACPU 221 or the LCPU 41 due to the unstable state of the voltage immediately after the power-on.

Although the rear converter for varying the focal length is exemplified as the intermediate accessory according to the embodiment of the present invention, the present invention is not limited to the rear converter. A similar effect as the embodiment of the present invention can be achieved by applying the present invention to a known auto-focusing (AF) adaptor, which is attached between a manual focus lens and a camera body when the manual focus lens is attached to the camera body having an auto-focus function.

An intermediate adaptor to which a close-up lens is attached may be applied to the intermediate accessory.

While the present invention has been described with reference to what are presently considered to be the preferred embodiments, it is to be understood that the invention is not limited to the disclosed embodiments. On the contrary, the invention is intended to cover various modifications and equivalent arrangements included without departing from the spirit of the present invention.

What is claimed is:

1. An interchangeable lens type camera system in which an intermediate accessory is removably attached between a camera body and a lens barrel, the interchangeable lens type camera system comprising: a first CPU provided in the camera body; a second CPU provided in the intermediate accessory; and a third CPU provided in the lens barrel, wherein the first CPU supplies a reset signal to the second CPU in association with attachment of the intermediate accessory, and the second CPU receives the reset signal supplied from the first CPU and supplies the reset signal to the third CPU.

2. The interchangeable lens type camera system according to claim 1, wherein the camera body includes a circuit for supplying power to the first CPU, the second CPU, and the third CPU, the first CPU controls the supply of the power to the second CPU, and the second CPU controls the supply of the power to the third CPU.

3. The interchangeable lens type camera system according to claim 2, wherein the first CPU controls the supply of the power to the second CPU after supplying the reset signal to the second CPU, and subsequently cancels the reset signal.

4. The interchangeable lens type camera system according to claim 2, wherein the second CPU controls the supply of the power to the third CPU after supplying the reset signal to the third CPU, and subsequently cancels the reset signal.

5. The interchangeable lens type camera system according to claim 4, wherein the second CPU supplies the reset signal to the third CPU after the first CPU cancels the reset of the second CPU.

6. An interchangeable lens type camera system including a camera body, an intermediate accessory removably attached to the camera body, and an interchangeable lens removably attached to the intermediate accessory, wherein the camera body includes a first CPU; an interlocking pin displaced in accordance with attachment of the intermediate accessory; and a detection switch that is connected to the first CPU, is shifted from a first state to a second state with the displacement of the interlocking pin in accordance with start of the attachment of the intermediate accessory, and is shifted from the second state to the first state in accordance with completion of the attachment of the intermediate accessory, wherein the intermediate accessory includes a second CPU reset by the first CPU; an interlocking pin displaced in accordance with attachment of the interchangeable lens; and a detection switch that is connected to the second CPU, is shifted from a third state to a fourth state with the displacement of the interlocking pin in accordance with start of the attachment of the interchangeable lens, and is shifted from the fourth state to the third state in accordance with completion of the attachment of the interchangeable lens, wherein the interchangeable lens includes a third CPU reset by the second CPU, and wherein the reset of the second CPU by the first CPU is canceled when the detection switch of the camera body is shifted from the second state to the first state, and the reset of the third CPU by the second CPU is canceled when the detection switch of the intermediate accessory is shifted from the fourth state to the third state.

7. The interchangeable lens type camera system according to claim 6, wherein the first CPU supplies a reset signal to the second CPU when the intermediate accessory is attached to the camera body and the detection switch of the camera body is shifted from the first state to the second state, controls supply of power to the second CPU, and cancels the reset signal when the detection switch of the camera body is shifted from the second state to the first state, wherein the second CPU supplies the reset signal to the third CPU when the interchangeable lens is attached to the intermediate accessory and the detection switch of the intermediate accessory is shifted from the third state to the fourth state, controls supply of power to the third CPU, and transmits to the first CPU information indicating that the interchangeable lens is attached when the detection switch of the intermediate accessory is shifted from the fourth state to the third state, wherein the first CPU transmits to the second CPU an instruction to cancel the reset of the third CPU on the basis of the information indicating that the interchangeable lens is attached, and wherein the second CPU cancels the reset signal of the third CPU in response to the instruction to cancel the reset of the third CPU.

8. The interchangeable lens type camera system according to claim 7, wherein, after controlling the supply of the power to the third CPU and canceling the reset of the third CPU, the second CPU stops the supply of the power to the third CPU and resets the third CPU with the displacement of the interlocking pin of the intermediate accessory.

9. An intermediate accessory removably attached between a camera body and a lens barrel, the intermediate accessory comprising: a second CPU that is reset by a first CPU provided in the camera body via a first reset line; a detection switch that is connected to the second CPU and detects completion of attachment of the lens barrel; a second reset line used for resetting a third CPU provided in the lens barrel;

and a power supply line used for supplying power from the camera body to the third CPU, wherein the intermediate accessory resets the third CPU provided in the lens barrel via the second reset line before the detection switch detects the completion of the attachment of the lens barrel, and cancels the reset of the third CPU after the detection switch detects the completion of the attachment of the lens barrel.

10. The intermediate accessory according to claim 9, wherein the second CPU controls the power supply line such that the power is supplied to the third CPU before the reset of the third CPU is canceled.

* * * * *